United States Patent
Scherer et al.

(10) Patent No.: US 11,940,574 B2
(45) Date of Patent: Mar. 26, 2024

(54) DETECTION SYSTEM FOR IONIZING RADIATION

(71) Applicant: Hochschule Mannheim, Mannheim (DE)

(72) Inventors: Ulrich Scherer, Jülich (DE); Dominik Krupp, Rödingen (DE)

(73) Assignee: Hochschule Mannheim, Mannheim (DE)

( * ) Notice: Subject to any disclaimer, the term of this patent is extended or adjusted under 35 U.S.C. 154(b) by 58 days.

(21) Appl. No.: 17/606,233

(22) PCT Filed: Apr. 30, 2020

(86) PCT No.: PCT/EP2020/062112
§ 371 (c)(1),
(2) Date: Oct. 25, 2021

(87) PCT Pub. No.: WO2020/221890
PCT Pub. Date: Nov. 5, 2020

(65) Prior Publication Data
US 2022/0299658 A1    Sep. 22, 2022

(30) Foreign Application Priority Data
Apr. 30, 2019 (DE) .......................... 102019111155.2

(51) Int. Cl.
*G01T 1/02* (2006.01)
*G01T 3/00* (2006.01)

(52) U.S. Cl.
CPC .............. *G01T 1/023* (2013.01); *G01T 3/008* (2013.01)

(58) Field of Classification Search
CPC .................................. G01T 1/023; G01T 3/008
See application file for complete search history.

(56) References Cited

U.S. PATENT DOCUMENTS 3,891,844 A    6/1975   Gibbons
3,922,555 A    11/1975  Chapius et al.
(Continued)

FOREIGN PATENT DOCUMENTS

DE    2143900 A1    3/1973

OTHER PUBLICATIONS

International Search Report and Written Opinion of International Application No. PCT/EP2020/062112, dated Jun. 26, 2020, 21 pages.
(Continued)

*Primary Examiner* — David P Porta
*Assistant Examiner* — Fani Polyzos Boosalis
(74) *Attorney, Agent, or Firm* — Grossman, Tucker, Perreault & PFleger PLLC; Steven J. Grossman

(57) ABSTRACT

The invention provides a detection system for ionizing radiation, a method of manufacturing a detection system for ionizing radiation, a method of detecting ionizing radiation, a detection chamber for detecting ionizing radiation by liquid scintillation counting, and a method of detecting ionizing radiation by liquid scintillation counting. The detection system for ionizing radiation comprises a detector with a detection surface. The detector is configured to detect ionizing radiation that is incident on the detection surface. An adsorption layer is provided on said detection surface, the adsorption layer being configured to bind target particles, wherein the target particles are radioactive atoms or molecules.

19 Claims, 10 Drawing Sheets

(56) References Cited

U.S. PATENT DOCUMENTS

Figure 1A:
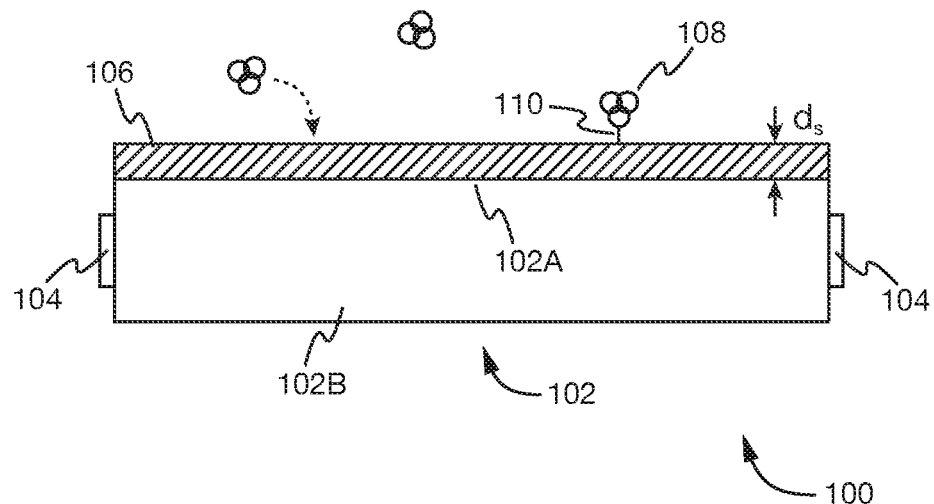

| | | | |
|---|---|---|---|
| 4,920,263 A | | 4/1990 | Fimian et al. |
| 5,466,930 A | * | 11/1995 | Schlenoff .................. G01T 7/02 250/361 R |
| 2002/0185613 A1 | | 12/2002 | Kalas et al. |

OTHER PUBLICATIONS

Dominik Krupp et al: "Prototype development of ion exchanging alpha detectors", Nuclear Instruments & Methods in Physics Research. Section A, vol. 897, Jul. 1, 2018, pp. 120-128.

Aswal D K et al: "Self assembled monolayers on silicon for molecular electronics", Analytica Chimica Acta, Elsevier, Amsterdam, NL. vol. 568, No. 1-2, May 24, 2006, pp. 84-108.

Rhijn W M et al: "Sulfonic acid functionalized ordered mesoporous materials as catalysts for condensation and esterfication reactions", Chemical Communications, Chemical Society, London, GB, Jan. 1, 1998, pp. 317-318.

Mohamud H et al: "Progress towards the development of a rapid analytical approach for separation of 226Ra using dibenzo-18-crown-6 ether functionalised silica (Si02) disks", Radiation Physics and Chemistry, vol. 140, Feb. 9, 2017, pp. 57-60.

\* cited by examiner

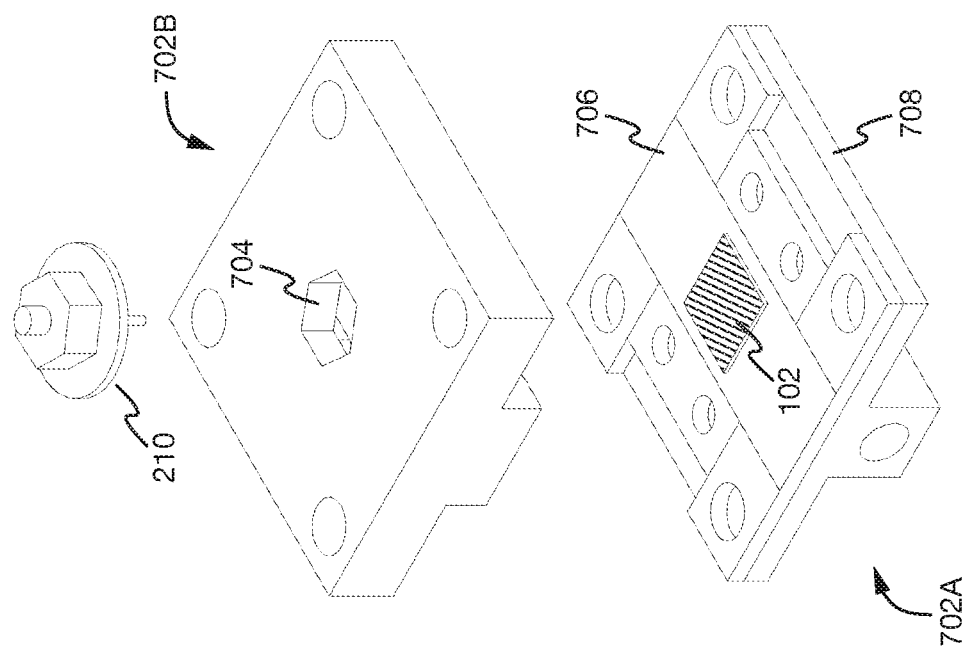
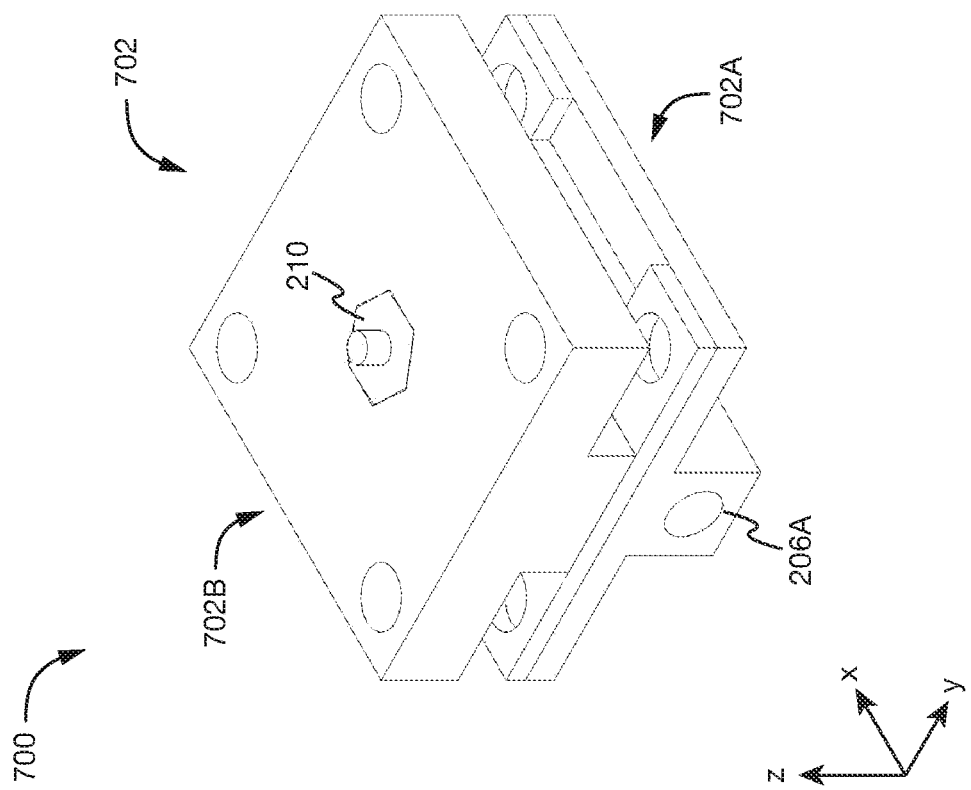
Fig. 7a
Fig. 7b

DETECTION SYSTEM FOR IONIZING RADIATION

RELATED APPLICATIONS

This application is a National Phase Application of International PCT Application No. PCT/EP2020/062112 filed Apr. 30, 2020, which claims priority to German Application No. DE102019111155.2 filed Apr. 30, 2019, both of which are fully incorporated herein by reference.

FIELD OF THE INVENTION

The present invention is in the field of nuclear chemistry. In particular, the invention relates to the detection of ionizing radiation.

BACKGROUND

Ionizing radiation like alpha particles, beta particles, x-rays or gamma rays may be created by the radioactive decay of atomic nuclei, which is exploited in a variety of applications, ranging from nuclear power to medical radiation therapy. Due to the high energy of the particles, ionizing radiation may ionize atoms or molecules and may thus be harmful to humans. Therefore, reliable means for the quantitative detection of ionizing radiation are of great importance.

Ionizing radiation can for example be detected with Geiger counters, scintillation detectors or semiconductor detectors, which may allow for determining a particle flux or energy spectrum of the ionizing radiation. In particular for alpha particles, however, the short range of the radiation complicates a reliable detection, e.g. for high-resolution alpha particle spectroscopy. In many cases, a time-consuming sample preparation and measurement with complex equipment may be required. Samples may for example be prepared using electrodeposition from a solution onto a substrate, which may then be transferred to a vacuum chamber for measurement. In Mohamud et al., *Radiat. Phys. Chem.* 140, 57 (2017), a functionalized silicon dioxide disk was used as a substrate to adsorb $^{226}$Ra and a spectrum of alpha particles emitted by the adsorbed $^{226}$Ra was subsequently measured using a separate semiconductor detector. Yet, results may vary due to fluctuating yields and low counting rates. Furthermore, such methods may not be suitable for detecting isotopes with a short half-life due to the long preparation times of the samples.

SUMMARY OF THE INVENTION

The object of the invention is thus to provide a device and methods that facilitate a fast and reliable detection of ionizing radiation.

This object is met by a detection system for ionizing radiation according to claim 1, a method of manufacturing a detection system for ionizing radiation according to claim 19, a method of detecting ionizing radiation according to claim 31, a detection chamber for detecting ionizing radiation by liquid scintillation counting according to claim 41, and a method of detecting ionizing radiation by liquid scintillation counting according to claim 42. Embodiments of the present invention are detailed in the dependent claims.

The detection system for ionizing radiation comprises a detector with a detection surface. The detector is configured to detect ionizing radiation that is incident on the detection surface. An adsorption layer is provided on said detection surface, the adsorption layer being configured to bind target particles, wherein the target particles are radioactive atoms or molecules.

Preferably, the detector is a semiconductor detector as detailed below. In other examples, the detector may be a gaseous ionization detector such as a proportional counter or a Geiger counter or may be a scintillation detector. The detector may comprise a detection zone, in which the ionizing radiation is to be detected, e.g. a p-n junction in a semiconductor detector, an ionization chamber in a gaseous ionization detector or a scintillation crystal in a scintillation detector. The detection zone may be configured to generate a measurement signal, in particular an electric measurement signal, when ionizing radiation reaches the detection zone, e.g. through the generation of electron-hole pairs in a semiconductor detector or the ionization of particles in an ionization chamber. The detection surface is a surface of the detector that is configured to transmit ionizing radiation incident on the detection surface, e.g. to the detection zone. Preferably, an absorption probability of the ionizing radiation in the detection surface is less than 5%, in one example less than 1% of an absorption probability in the detection zone.

The adsorption layer may for example be a coating or film that is deposited on the detection surface. The adsorption layer is configured to bind target particles e.g. from a liquid or gaseous sample medium in contact with the adsorption layer. Thereby, the adsorption layer allows for immobilizing target particles in the vicinity of the detection surface, where the target particles may undergo a radioactive decay and emit ionizing radiation. Due to the small distance between a target particle bound by the adsorption layer and the detection surface, an absorption probability and/or scattering probability for the ionizing radiation between the point of emission and the detection zone of the detector may be reduced and the solid angle covered by the detection zone may be increased. This may increase a detection efficiency and spectral resolution of a measurement, in particular for short-range radiation like alpha particles and x-rays. Preferably, the adsorption layer covers the entire detection surface.

In a preferred embodiment, the adsorption layer is configured to bind the target particles by chemisorption, i.e. the adsorption layer may be configured to adsorb target particles on its surface through the formation of chemical bonds with the target particles, e.g. through ion exchange reactions, complexation or the formation of hydrogen bonds. Additionally or alternatively, the adsorption layer may be configured to adsorb target particles by physisorption, i.e. through van der Waals interaction between the surface of the adsorption layer and the target particles. In some examples, the adsorption layer may also absorb the target particles, i.e. the target particles may permeate the adsorption layer.

Preferably, the adsorption layer is attached to the detection surface through chemical bonds between the adsorption layer and the detection surface. In other words, the adsorption layer may be deposited directly onto the detection surface and may be connected to the detection surface by forming chemical bonds with the detection surface.

A thickness of the adsorption layer may be less than 20 nm, preferably less than 10 nm. This may be advantageous to reduce an absorption probability or scattering probability of the ionizing radiation within the adsorption layer. Preferably, the thickness of the adsorption layer varies by less than 50%, in some examples less than 25% over the extent of the adsorption layer.

In a preferred embodiment, the adsorption layer is a monomolecular layer of adsorbent molecules, in particular ion exchangers or complexing agents, wherein the adsorbent molecules are configured to form chemical bonds with the target particles. In other examples, the adsorption layer may comprise multiple layers of adsorbent molecules, see e.g. D. Krupp et al., Nuclear Inst. and Methods in Physics Research, A 897, 120 (2018), where the formation of a thiol-functionalized silane multilayer on a silicon charged-particle detector was reported. The adsorbent molecules may for example comprise a head group configured to form a chemical bond with the detection surface and a linker chain connecting the head group to a functional group that is configured to form a chemical bond with a target particle. The head group may for example comprise a compound selected from the group consisting of silanes ($SiX_3$), azides ($N_3X$), alkenes, alkynes and bifunctional thiols. The linker chain may for example comprise an alkyl chain ($(CH_2)_n$), cyclic alkyl groups, aromatic groups and/or triazole-based groups. The functional group may for example be a cation exchanger or an anion exchanger. The functional group may e.g. comprise a compound selected from the group consisting of sulfonic acid ($SO_3H$), quaternary ammonium salts ($NR_4X$), complexation agents such as diglycolamide derivates like N,N,N',N'-tetraoctyl diglycolamide (TODGA), crown ether, tributyl phosphate derivates, ionic liquids such as i-methylimidazol derivates, pyrrolidine, β-diketones, cavitand-groups like calixarene, cryptands, clathrate and bioactive substances like antibodies, proteins and nucleotides.

The detector may in particular be configured to detect x-ray photons and/or alpha particles that are incident on the detection surface. Accordingly, the target particles may be x-ray-emitting and/or alpha-emitting particles and may e.g. be or comprise a radioisotope selected from the group consisting of the decay products of the thorium (4n) series, the neptunium (4n+1) series, the uranium (4n+2) series, the actinium ($4n+_3$) series, the actinide series and the transactinide series as well as cyclotron-produced radionuclides and their decay products. The target particles may in particular be or comprise uranium, thorium, plutonium, americium, radon, actinium or radium. Alternatively or additionally, the detector may also be configured to detect other types of ionizing radiation, for example beta particles, gamma radiation and/or X rays.

In a preferred embodiment, the detector is a semiconductor charged-particle detector, in particular a silicon charged-particle detector or a germanium charged-particle detector. The semiconductor charged-particle detector may comprise a semiconductor diode, e.g. a p-n junction diode or a PIN diode having a p-doped, an intrinsic and an n-doped layer. The semiconductor charged-particle detector may further comprise conducting contacts, e.g. metallic contact pads that are in contact with the semiconductor diode or connected to the semiconductor diode through conduction lines or wires. The detection surface of a semiconductor charged-particle detector may for example be a passivated surface of the semiconductor diode and may e.g. consist of or comprise a silicon dioxide layer or a germanium dioxide layer. Alternatively, the detection surface of a semiconductor charged-particle detector may for example be a dead layer deposited on a surface of the semiconductor diode and may e.g. consist of or comprise gold or aluminum. The semiconductor charged-particle detector may in particular be an unsealed or unpackaged semiconductor diode without a frame or housing, i.e. the semiconductor structure, the passivated surface, conduction lines and/or conducting contacts of the semiconductor diode may be exposed at least in part.

The adsorption layer may comprise functionalized silanes, e.g. adsorbent molecules comprising a silane head group, and/or functionalized azides, e.g. adsorbent molecules comprising a azide head group. The functionalized silanes may for example be derived from (3-mercaptopropyl)trimethoxysilane (MPTMS), (3-aminopropyl)trimethoxysilan (APTMS), (3-aminopropyl)triethoxysilane (APTES) or 3-(Triethoxysilyl)propyl isocyanate (TESPI). This may facilitate attaching the adsorption layer to the detection surface of a semiconductor charged-particle detector, e.g. via chemical bonds between the functionalized silanes and an hydroxylated silicon dioxide surface. In one example, the adsorption layer is a monomolecular layer of functionalized silanes, e.g. sulfonic acid-functionalized silanes.

The detection system may further comprise a flow cell, wherein the detector is mounted in the flow cell such that the detection surface of the detector is in contact with an inner volume of the flow cell. The detector may for example be attached to or integrated in a side wall of the inner volume of the flow cell. The flow cell may be used to provide a sample medium containing target particles such that the sample medium is in contact with the adsorption layer of the detector and target particles may be adsorbed or absorbed by the adsorption layer.

The flow cell may comprise an input fluid connector and an output fluid connector, wherein the input and output fluid connectors are in communication with the inner volume of the flow cell, e.g. through fluid channels connecting the inner volume to the input and output fluid connectors. The input and output fluid connectors may be configured to receive a sample medium, in particular a fluid sample medium, e.g. through a tube connected to the respective connector. The input and output fluid connectors may be configured to be removably connected to a tube or an external connector, e.g. via a threaded or non-threaded tube fitting. Preferably, the input and output fluid connectors are standardized connectors, e.g. comprising an ISO metric screw thread or a Unified Thread Standard (UTS) thread. In some examples, the input and/or output fluid connector is/are configured to be connected to a fluid connector of another flow cell, e.g. such that multiple flow cells may be connected in series to create a continuous fluid path. The input and output fluid connectors may for example be a matching pair of a male and female connector, respectively.

The flow cell may also comprise an electrical connector that is electrically coupled to the detector and is configured to be removably connected to an external device such that the detector is electrically coupled to the external device. The external device may for example be a measuring device configured to read-out a measurement signal from the detector as detailed below. The electrical connector may be configured to be removably connected to the external device through a cable and may e.g. be a BNC or SMA connector. In other examples, the electrical connector may be configured to provide a rigid mechanical connection to the external device and may for example comprise conducting pins to be inserted into the external device and/or may comprise a recess or cut-out with a conducting contact to receive a pin of the external device. Alternatively or additionally, the electrical connector and/or the flow cell may e.g. comprise a hook, clip or screw to removably attach the flow cell to the external device.

The detection system may further comprise a measuring device with a controller, wherein the controller is configured to read out a measurement signal from the detector when the detector is electrically coupled to the measuring device. The measuring device may for example be configured to be electrically coupled to the detector through the electrical connector of the flow cell, e.g. via a cable or pins as described above. Such a modular setup may allow for using multiple flow cells with a single measuring device, e.g. flow cells comprising detectors with different adsorption layers and/or for testing different sample media. In some examples, measuring device may be configured to be connected to multiple flow cells and/or multiple detectors simultaneously. The measuring device may comprise a measuring instrument, in particular a voltmeter or ammeter, that is configured to perform a measurement of the measurement signal and provide the measured value to the controller. The measuring instrument may furthermore be configured to apply a control signal, in particular a voltage to the detector, e.g. a bias voltage for a semiconductor diode.

In a preferred embodiment, the controller is configured to determine an energy spectrum of the ionizing radiation incident on the detection surface of the detector from the measurement signal of the detector, e.g. from the measured values received from the measurement instrument. In some examples, the measurement signal may be an electric current or voltage. An ionizing particle incident on the detection surface may for example generate a current or voltage spike, which may also be referred to as an event in the following. The controller may be configured to determine an energy of the ionizing particle from an amplitude or time-integrated amplitude of electric current or voltage. The controller may in particular be configured to determine an energy spectrum of the ionizing radiation from a plurality of events detected by the detector.

The controller may furthermore be configured to determine a time trace of the ionizing radiation incident on the detection surface of the detector from the measurement signal of the detector. The time trace may for example be a rate of events as a function of time. The controller may e.g. be configured to log an event sequence of events detected by the detector, wherein the event sequence may e.g. comprise a timestamp and an energy determined for each event detected by the detector. The controller may also be configured to determine a half-life of a substance from the time trace and/or to determine decay chain correlations such as alpha-alpha correlations.

In some examples, the detector may be a first detector and the detection system may further comprise a second detector. The second detector may be configured to detect ionizing radiation that is incident on a detection surface of the second detector. The second detector may also be mounted in the flow cell such that the detection surface of the second detector is in contact with the inner volume of the flow cell. In one example, the detection system may comprise a plurality of detectors, e.g. between 3 and 10 detectors.

In a preferred embodiment, an adsorption layer is provided on the detection surface of the second detector, wherein the adsorption layer of the second detector is configured to bind target particles. The adsorption layer of the second detector may be similar to the adsorption layer of the first detector, i.e. may be configured to bind to the same type of target particles. Using the second detector may thus increase the detection efficiency for target particles by increasing the area of covered by the detectors.

In other examples, the adsorption layers of the first and second detectors may exhibit different adsorption properties with respect to various types of target particles. For example, the adsorption layer of the first detector may be configured to bind target particles of a first type and the adsorption layer of the second detector may be configured to bind target particles of a second type. Target particles of the first type may for example be radioisotopes of a first type or molecules comprising a radioisotope of the first type and target particles of the second type may for example be radioisotopes of a second type or molecules comprising a radioisotope of the second type. In particular, the adsorption layer of the first detector may be configured to bind target particles of the first type, but not target particles of the second type and the adsorption layer of the second detector may be configured to bind target particles of the second type, but not target particles of the first type. This may allow for performing independent measurements for target particles of the first and second type using the first and second detector, respectively. In some examples, a plurality of detectors may be used, each of which comprises an adsorption layer that is configured to selectively bind a certain type of target particles.

In one example, the first and second detectors may be mounted in the flow cell such that the detection surface of the second detector faces the detection surface of the first detector. The detection surfaces of the first and second detectors may be parallel or may be inclined with respect to each other by an angle of less than 5°, preferably less than 1°. This may increase the solid angle covered by the detectors since the first detector may detect ionizing radiation emitted by a target particle bound to the adsorption surface of the second detector and vice versa. In particular for short-range ionizing radiation like alpha particles, a small distance between the detection surfaces may be advantageous. A distance between the detection surfaces of the first and second detectors may for example be less than 30 µm, preferably less than 10 µm.

The invention furthermore relates to a method of manufacturing a detection system for ionizing radiation. The method comprises providing a detector with a detection surface, wherein the detector is configured to detect ionizing radiation that is incident on the detection surface. The method further comprises depositing an adsorption layer onto the detection surface, the adsorption layer being configured to bind target particles, wherein the target particles are radioactive atoms or molecules.

As in the detection system described above, the detector may for example be a semiconductor detector, a gaseous ionization detector or a scintillation detector and may comprise a detection zone that is configured to generate a measurement signal when ionizing radiation reaches the detection zone. The detector may in particular be an unsealed semiconductor diode, e.g. a silicon PIN diode as detailed below. The detection surface is a surface of the detector that is configured to transmit ionizing radiation incident on the detection surface, e.g. to the detection zone. In one example, the detection surface may be a passivation layer, e.g. a silicon dioxide layer, on a semiconductor diode or a dead layer, e.g. comprising or consisting of gold or aluminum, on a semiconductor diode.

The adsorption layer is configured to bind target particles e.g. from a liquid or gaseous sample medium in contact with the adsorption layer. The adsorption layer may for example be formed on the detection surface by depositing an adsorption material or adsorption substance onto the detection surface that is configured to bind target particles. In some examples, the adsorption layer may be formed on the detection surface by depositing a precursor material or precursor substance onto the detection surface, which is subsequently transformed to the adsorption material, e.g. through a chemical reaction. The adsorption layer may for example be deposited onto the detection surface by chemical deposition. In one example, the adsorption layer may be deposited by chemical solution deposition by exposing the detection surface to a solution containing the adsorption material or a precursor thereof. In a preferred embodiment, the adsorption layer is deposited by chemical vapor deposition by exposing the detection surface to a gas containing the adsorption material or a precursor thereof.

Depositing the adsorption layer onto the detection surface may in particular comprise grafting adsorbent molecules, in particular ion exchangers or complexing agents, onto the detection surface, wherein the adsorbent molecules are configured to chemically bind to the target particles. In a preferred embodiment, the adsorption layer is a monomolecular layer of the adsorbent molecules. Grafting adsorbent molecules onto the detection surface comprises forming chemical bonds between the detection surface and the adsorbent molecules, e.g. a head group of the adsorbent molecules, and may further comprise forming chemical bonds between adjacent adsorbent molecules. As described above, the adsorbent molecules may for example comprise a head group configured to form a chemical bond with the detection surface and a linker chain connecting the head group to a functional group that is configured to form a chemical bond with a target particle. The head group may for example comprise a compound selected from the group consisting of silanes (SiX), azides ($N_3X$), alkenes, alkynes and bifunctional thiols. The linker chain may for example comprise an alkyl chain $((CH_2)_n)$, cyclic alkyl groups, aromatic groups and/or triazole-based groups. The functional group may for example be a cation exchanger or an anion exchanger. The functional group may e.g. comprise a compound selected from the group consisting of sulfonic acid ($SO_3H$), quaternary ammonium salts ($NR_4X$), complexation agents such as diglycolamide derivates like N,N,N',N'-tetraoctyl diglycolamide (TODGA), crown ether, tributyl phosphate derivates, ionic liquids such as i-methylimidazol derivates, pyrrolidine, β-diketones, cavitand-groups like calixarene, cryptands, clathrate and bioactive substances like antibodies, proteins and nucleotides.

In one example, the adsorbent molecules are grafted by chemical vapor deposition at a temperature between 20° C. and 70° C., preferably between 30° C. and 50° C. Using a low temperature may reduce the risk of damaging the detector during the deposition of the adsorption layer. The temperature for the chemical vapor deposition may in particular be chosen to be well below the boiling point of the adsorption substance. In some examples, the temperature for the chemical vapor deposition may be chosen such that the vapor pressure of the adsorption substance is between 0.01 mbar and 20 mbar, preferably between 1 mbar and 5 mbar.

In some embodiments, grafting the adsorbent molecules onto the detection surface comprises grafting linker molecules onto the detection surface and transforming the linker molecules to the adsorbent molecules by modifying a functional group of the linker molecules such that the functional group is configured to chemically bind to a target particle. The linker molecules may for example comprise a head group configured to form a chemical bond with the detection surface and a linker chain connecting the head group to the functional group of the linker molecule. The head group and/or linker chain of the linker molecules may correspond to the head group and linker chain, respectively, of the adsorbent molecules. The functional group of the linker chain may e.g. comprise a compound selected from the group consisting of thiol (SH), amines ($NR_2$; R=H—; alkyl-, aryl-), halogenides (e.g. —Cl), alkoxy groups, alkene, alkyne, hydroxides, ester, aldehydes, ketones, carboxylic acids, boronic acid pinacol ester, phosphonates, nitrile, isocyanate, thiocyanate, isothiocyanate, nitro, azo, aromatic, epoxy, glycidyl, methacryloxymethyl and imidazol. In some examples, the linker molecules may not comprise a functional group and may be transformed to the adsorption molecules by adding a functional group to the linker molecules that is configured to chemically bind to a target particle. The linker molecules may for example be (3-mercaptopropyetrimethoxysilane (MPTMS), (3-aminopropyl)trimethoxysilan (APTMS), (3-aminopropyl)triethoxysilane (APTES) or 3-(Triethoxysilyepropyl isocyanate (TESPI).

Depositing the adsorption layer onto the detection surface may further comprise curing the detection surface in the presence of water vapor at a temperature between 30° C. and 70° C., preferably between 40° C. and 60° C. This may improve the homogeneity of the adsorption layer by filling vacancies within the adsorption layer and/or binding or removing unbound adsorbent molecules. As for the chemical vapor deposition, curing at a low temperature may reduce the risk of damaging the detector during the curing.

As mentioned above, the detector may be an unsealed or unpackaged semiconductor diode, in particular a silicon PIN diode, i.e. the semiconductor structure, the passivation layer, conduction lines and/or conducting contacts of the semiconductor diode may be exposed at least in part. Using an unsealed semiconductor diode may allow for reducing the distance between the adsorption layer and the detection zone of the detector, i.e. the p-n junction of the semiconductor diode, and may simplify integration of the detector into a device, e.g. a flow cell. On the other hand, unsealed semiconductor diodes are fragile and prone to damage. The method according to the invention facilitates the deposition of an adsorption layer onto an unsealed semiconductor diode by employing gentle processing techniques at low temperatures.

The adsorption layer, in particular the adsorbent molecules, may comprise a functionalized silane or a functionalized azide. The adsorbent molecules may e.g. comprise or consist of a silane head group linked to a functional group by a linker chain. The adsorbent molecules may for be derived from (3-mercaptopropyl)trimethoxysilane (MPTMS), (3-aminopropyl)trimethoxysilan (APTMS), (3-aminopropyl)triethoxysilane (APTES) or 3-(Triethoxysilyl)propyl isocyanate (TESPI). As described above, this may facilitate attaching the adsorption layer to the detection surface of a semiconductor charged-particle detector, e.g. via chemical bonds between the functionalized silanes and a hydroxylated silicon dioxide surface. In one example, the adsorbent molecules are sulfonic acid-functionalized silanes.

The method may further comprise chemically activating the detection surface by plasma treatment, ozone treatment, UV irradiation or a combination thereof. Thereby, the detection surface may be cleaned by removing contaminants and docking sites for adsorbent molecules and/or linker molecules may be created, e.g. by hydroxylation of the detection surface.

In one example, chemically activating the detection surface comprises exposing the detection surface to a water plasma. In one example, the detection surface is exposed to the water plasma at a temperature between 10° C. and 40° C., preferably between 20° C. and 30° C. A low pressure water plasma may allow for a gentle cleaning and hydroxylation of the detection surface without damaging the detector. Other cleaning methods, e.g. using plasma etching, RCA clean or a piranha solution comprising sulfuric acid and hydrogen peroxide, may in particular affect exposed portion of the detector such as conduction lines and/or conducting contacts. Using water plasma may also reduce the probability of damaging the detector compared treatment of the detection surface with other plasmas, for example oxygen plasma.

The method may further comprise mounting the detector in a flow cell such that the detection surface of the detector is in contact with an inner volume of the flow cell. The detector may for example be attached to or integrated into a side wall of the inner volume of flow cell, e.g. using glue or a mechanical mounting structure comprising a fastener. This may further comprise connecting conducting contacts of the detector to an electrical connector of the flow cell.

The invention furthermore provides a method of detecting ionizing radiation. The method comprises (1) providing a detector with a detection surface and an adsorption layer provided on said detection surface, wherein the detector is configured to detect ionizing radiation that is incident on the detection surface and the adsorption layer is configured to bind target particles, wherein the target particles are radioactive atoms or molecules; (2) binding target particles to the adsorption layer; and (3) detecting ionizing radiation incident on the detection surface with the detector. The numbering of steps is for clarity only and does not imply a certain order of execution of the method. As far as technically feasible, steps of the method may be permuted and may in particular be performed simultaneously at least in part.

Preferably, the detector is a detector according to one of the embodiments of the invention described above. Providing the detector may in particular comprise providing a flow cell that the detector is mounted in. In other examples, the detector may be provided as a separate device, i.e. without a flow cell.

Detecting ionizing radiation incident on the detection surface of the detector may comprise measuring a measurement signal generated by the detector, e.g. an electric current or voltage generated by the detector upon absorption or scattering of an ionizing particle in the detection zone. In one example, detecting ionizing radiation incident on the detection surface may comprise detecting events, wherein an event may for example be defined as an increase of the measurement signal beyond a predetermined threshold. Additionally, an energy of an ionizing particle may be determined, e.g. by determining an amplitude or time-integrated amplitude of the measurement signal for an event. In some examples, a rate of events may be determined from the measurement signal, e.g. by counting events or from an amplitude of the measurement signal.

The target particles may for example be bound to the adsorption layer by chemisorption, e.g. through the formation of chemical bonds between adsorbent molecules in the adsorption layer, in particular a functional group of the adsorbent molecules, and the target particles. In other examples, the target particles may additionally or alternatively be bound to the adsorption surface by physisorption and/or may be absorbed by the adsorption layer.

The method may further comprise providing a fluid sample medium, e.g. a solution, containing the target particles such that the adsorption layer is in contact with the sample medium. Thereby, target particles in the sample medium may be adsorbed or absorbed by the adsorption layer. Providing the fluid sample medium may comprise generating a flow of the sample medium through the inner volume of a flow cell. A flow velocity of the flow may be adapted to a shape and/or size of the inner volume, for example the distance between the adsorption layers of the first and second detectors, e.g. to ensure that the sample medium covers the entire adsorption layers. In some examples, the sample medium may contain the target particles in an ionized form. Binding the target particles to the adsorption layer may comprise an ion exchange between the adsorption layer and the sample medium. The ion exchange may e.g. comprise the adsorption of an ionized target particle by an adsorbent molecule and the corresponding release of an ion or ionized molecule from the adsorbent molecule to the sample medium. Alternatively, binding the target particles to the adsorption layer may comprise a complexation between a molecule in the adsorption layer and a target particle from the sample medium.

In some examples, the sample medium may contain precursor radioisotopes or precursor molecules comprising a radioisotope. Providing the fluid sample may comprise transforming the precursor radioisotopes or precursor molecules to the target particles, e.g. to facilitate or enable binding to the adsorption layer as the adsorption layer may not bind precursor radioisotopes or precursor molecules. Preferably, an equilibrium constant of the binding reaction between the target particles and the adsorption layer is larger than 10, in some examples larger than 100.

If the detector is mounted in a flow cell, the method may further comprise connecting the flow cell to a measuring device that is configured to read out a measurement signal from the detector. The measuring device may subsequently be used to quantitatively analyze the ionizing radiation incident on the detection surface, e.g. to obtain a rate of events, a time trace, an energy spectrum and/or a half-life of a substance. The method may furthermore comprise disconnecting the flow cell from the measuring device, e.g. such that the method can be repeated subsequently using a different flow cell.

The method may also comprise determining an energy spectrum of the ionizing radiation incident on the detection surface, e.g. using the measuring device. Determining the energy spectrum of the ionizing radiation incident on the detection surface may comprise determining the energy of ionizing particles, e.g. from an amplitude or time-integrated amplitude of the measurement signal associated with an event, wherein the energy spectrum may be obtained from the particle energies of a plurality of events. The method may further comprise determining a continuous background spectrum in the measured energy spectrum and subtracting the continuous background spectrum from the measured energy spectrum. The continuous background spectrum may for example arise from ionizing radiation emitted by target particles in the sample medium that are not bound by the adsorption surface. Subtracting the continuous background spectrum may thus allow for isolating the contribution of target particles bound by the adsorption surface. This may improve the spectral resolution. The continuous background spectrum may for example be determined by fitting a background function to the measured energy spectrum or a part thereof or performing a reference measurement with a detector without an adsorption layer.

In some examples, the method may further comprise removing target particles bound to the adsorption layer, e.g. to regenerate the detector after ionizing radiation incident on the detection surface has been detected. This may allow for re-using the detector for multiple measurements by repeatedly executing the method. Removing target particles bound to the adsorption layer may comprise rinsing the adsorption layer with a regeneration fluid, which may e.g. comprise hydrochloric acid.

The method may be used to selectively detect target particles of a specific type. The detector may for example be a first detector and the target particles may be target particles of a first type, e.g. comprising a radioisotope of a first type. The adsorption layer of the first detector may be configured to bind target particles of the first type, but not target particles of a second type, wherein target particles of a second type may e.g. comprise a radioisotope of a second type. This may allow for selectively detecting target particles of the first type using the first detector without the measurement being influenced by the presence of target particles of the second type.

The method may also be used to detect target particles of different types. For this, the method may comprise providing a second detector with a detection surface and an adsorption layer provided on said detection surface of the second detector, wherein the second detector is configured to detect ionizing radiation that is incident on the detection surface of the second detector and the adsorption layer of the second detector is configured to bind target particles of the second type, but not target particles of the first type. The method may further comprise binding target particles of the second type to the adsorption layer of the second detector and detecting ionizing radiation incident on the detection surface of the second detector with the second detector, e.g. as described above for the first detector.

The method may also comprise transforming precursor radioisotopes of the first type or precursor molecules comprising a radioisotope of the first type to target particles of the first type and transforming precursor radioisotopes of the second type or precursor molecules comprising a radioisotope of the second type to target particles of the second type, e.g. as described above.

LIST OF FIGURES

Figure 1B:
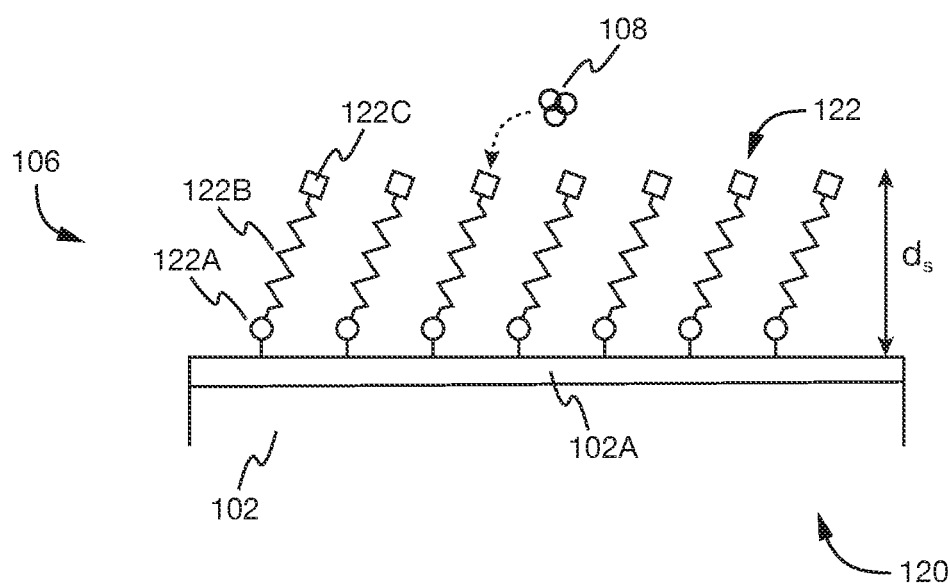
Figure 2A:
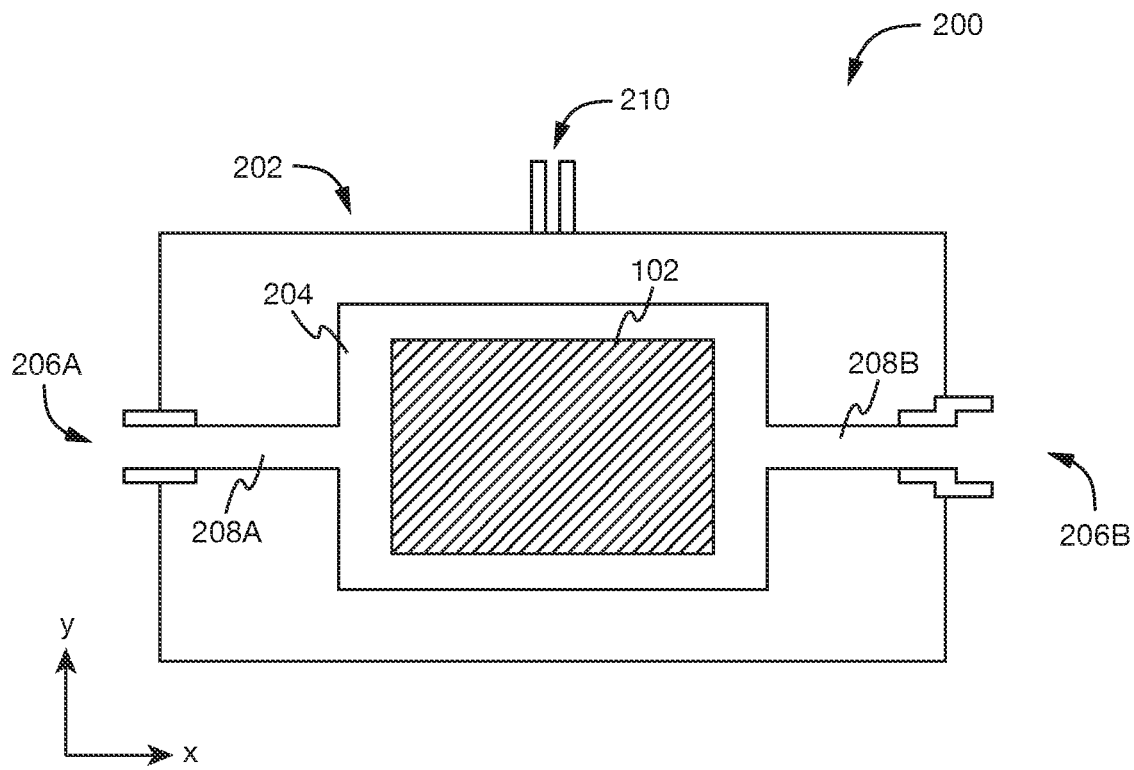
Figure 2B:
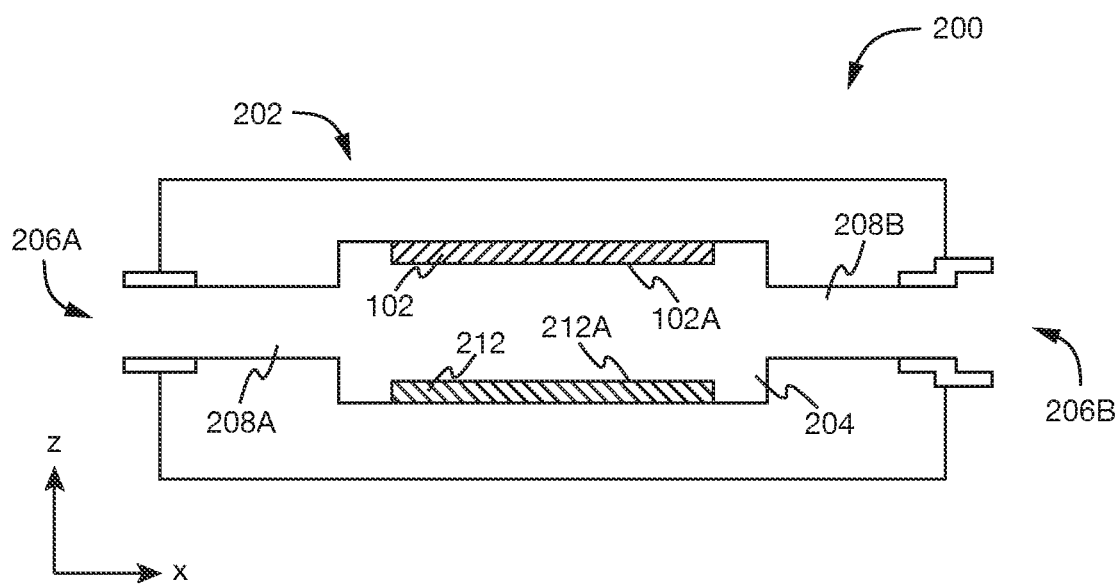
Figure 3A:
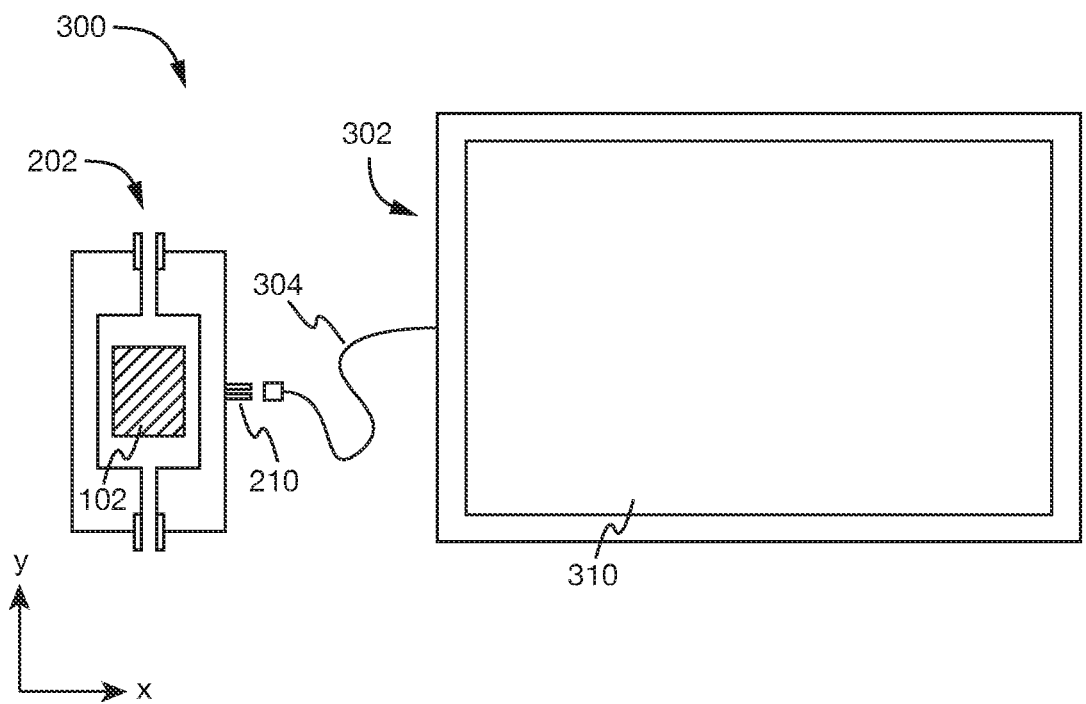
Figure 3B:
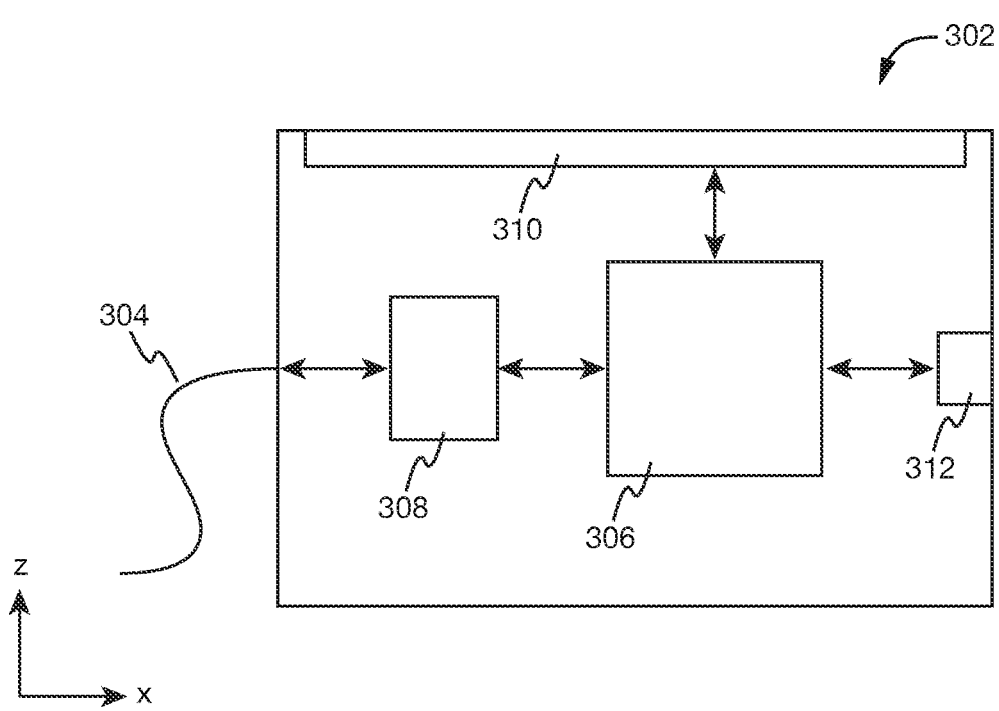
Figure 4:
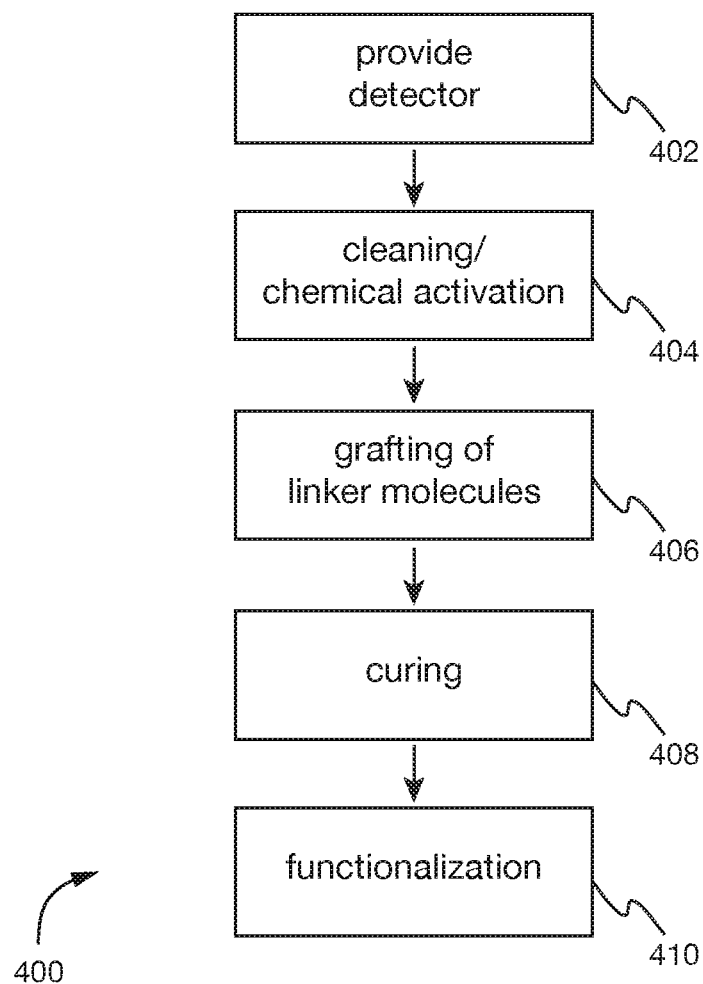
Figure 5:
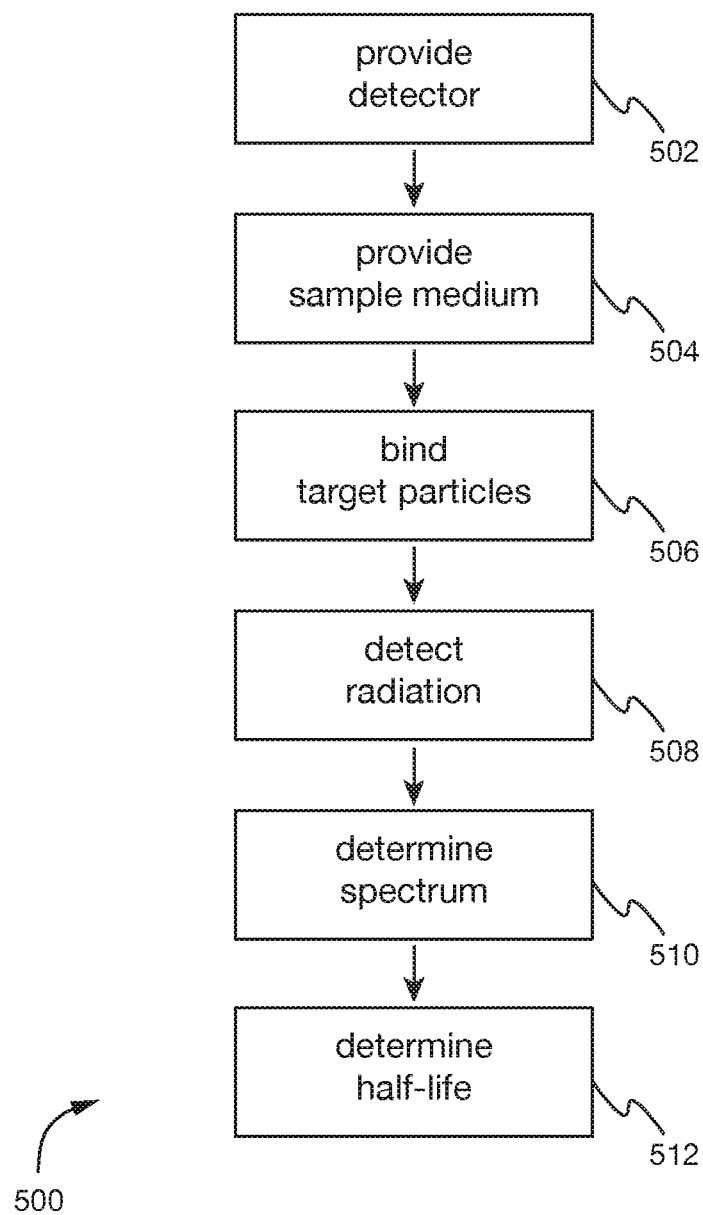
Figure 6:
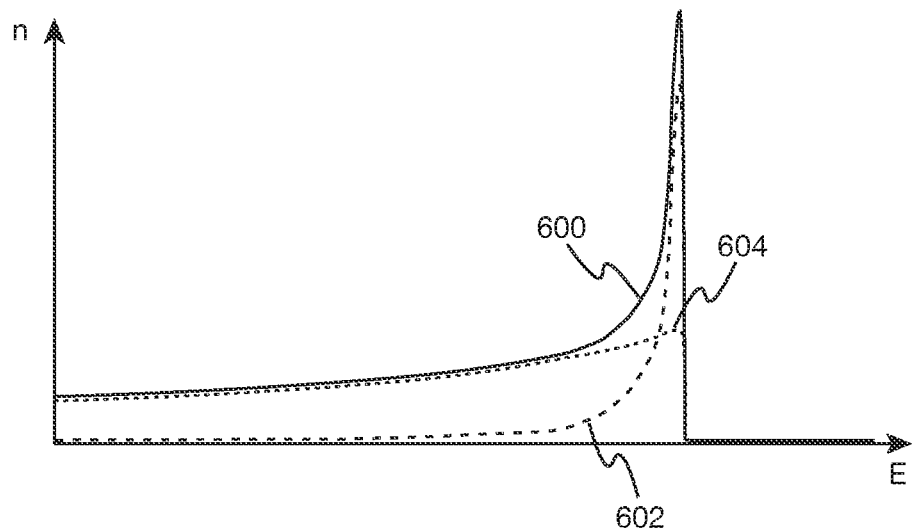
Figure 6:
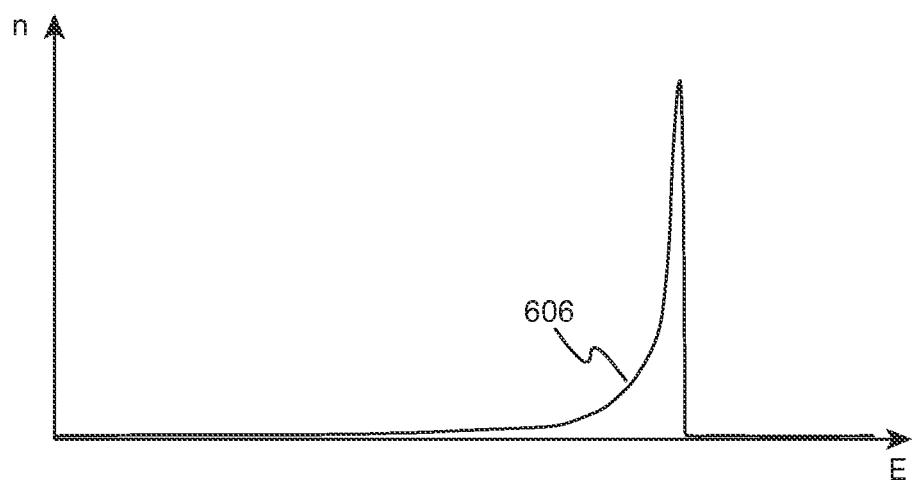
Figure 7C:
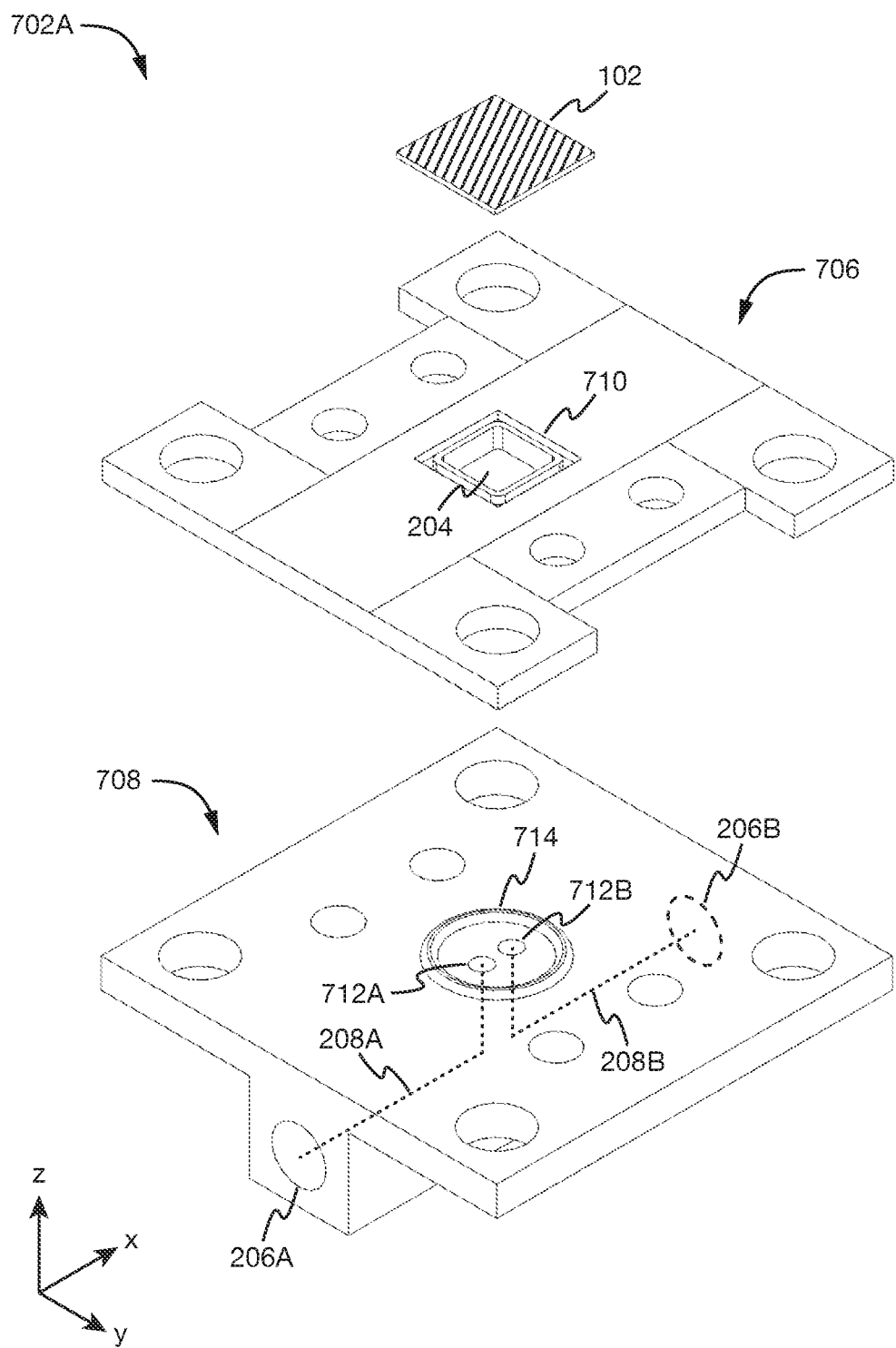
Figure 8:
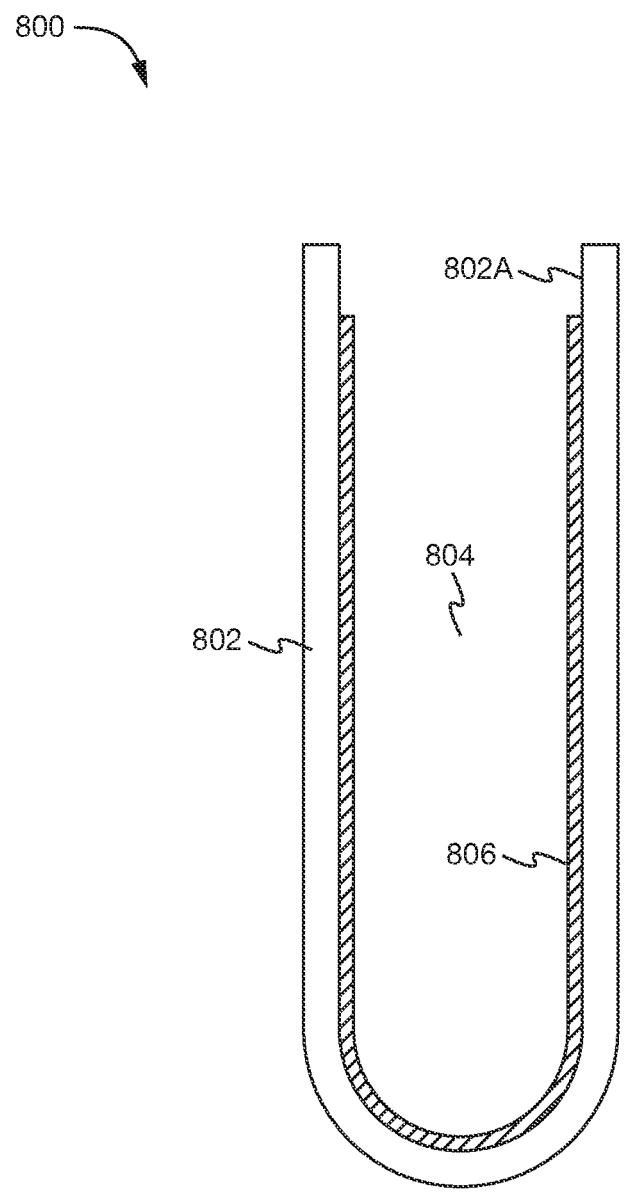
Figure 9:
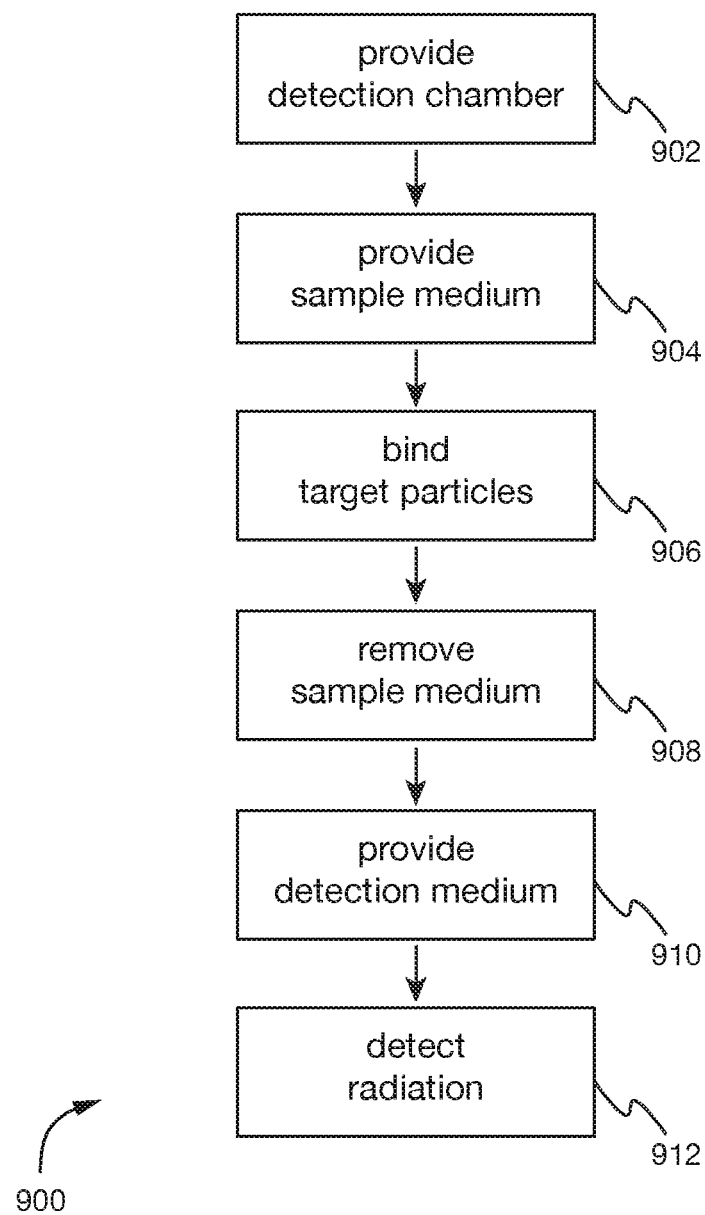

In the following, a detailed description of the invention and exemplary embodiments thereof is given with reference to the figures. The figures show schematic illustrations of FIG. 1a: a detection system for ionizing radiation according to an exemplary embodiment of the invention;

FIG. 1b: a detection system for ionizing radiation with a monomolecular adsorption layer in accordance with an exemplary embodiment of the invention;

FIG. 2a: a detection system for ionizing radiation comprising a flow cell according to an exemplary embodiment of the invention in a sectional top view;

FIG. 2b: the detection system for ionizing radiation of FIG. 2a in a sectional side view;

FIG. 3a: a detection system for ionizing radiation comprising a flow cell and a measuring device in accordance with an exemplary embodiment of the invention in a sectional top view;

FIG. 3b: the measuring device of the detection system for ionizing radiation of FIG. 3a in a sectional side view;

FIG. 4: a method of manufacturing a detection system for ionizing radiation in accordance with an embodiment of the invention;

FIG. 5: a method of detecting ionizing radiation in accordance with an embodiment of the invention;

FIG. 6: a background subtraction according to an embodiment of the invention;

FIG. 7a: a detection system for ionizing radiation comprising a flow cell according to an exemplary embodiment of the invention in a perspective view;

FIG. 7b: the detection system for ionizing radiation of FIG. 7a in an exploded view;

FIG. 7c: a bottom part of the detection system for ionizing radiation of FIG. 7a in an exploded view;

FIG. 8: a detection chamber for detecting ionizing radiation by liquid scintillation counting according to an exemplary embodiment of the invention; and FIG. 9: a method of detecting ionizing radiation by liquid scintillation counting in accordance with an exemplary embodiment of the invention.

DESCRIPTION OF THE PREFERRED EMBODIMENTS

FIG. 1a depicts a sectional view of a detection system 100 for ionizing radiation according to an embodiment of the invention. The detection system 100 comprises a detector 102 that is configured to detect ionizing radiation incident on a detection surface 102A of the detector 102. The detector 102 comprises a detection zone 102B in which ionizing particles (not shown), in particular alpha particles and x-ray photons, are to be detected by creating an electric measurement signal at metallic contacts 104 of the detector 102. The detection surface 102A is configured to transmit ionizing radiation incident on the detection surface 102A to the detection zone 102B. In the example of FIG. 1, the detector 102 is a semiconductor charged-particle detector comprising a p-n junction (not shown), wherein one of the contacts 104 is connected to the p-doped region of the p-n junction and the other one of the contacts 104 is connected to n-doped region of the p-n junction, e.g. via a front side and back side electrode, respectively, as seen from the detection surface 102A. When an ionizing particle, for example an alpha particle, enters the detection zone 102B, the ionizing particle may generate electron-hole pairs in the p-n junction, which may be detected as a current or voltage at the metallic contacts 104. The metallic contacts 104 may furthermore be used to apply a bias voltage to the detector 102. A surface area of the detection surface 120A may for example be between 1 mm$^2$ and 3000 mm$^2$.

An adsorption layer 106 is provided on the detection surface 102A of the detector 102 such that the adsorption layer 106 covers the entire detection surface 102A. The adsorption layer 106 is configured to bind target particles 108, wherein the target particles 108 are radioactive atoms or molecules. In the example shown in FIG. 1a, the target particles 108 are adsorbed by chemisorption, i.e. the formation of chemical bonds no between the adsorption layer 106 and the target particles 108. In this way, target particles 108 may be localized in the immediate vicinity of the detection surface 102A. This may increase the probability of ionizing radiation emitted by the target particles 108 reaching the detection zone 102B due to the large solid angle covered by the detection zone 102B and the reduced absorption probability and/or scattering probability of the ionizing radiation between the emitting target particles 108 and the detection zone 102B. For this, a small thickness $d_s$ of the adsorption layer 106 may be advantageous. The thickness $d_s$ may for example be between 1 nm and 20 nm.

FIG. 1b depicts a zoomed-in sectional view of another detection system 120 for ionizing radiation according to an exemplary embodiment of the invention. The detection system 120 also comprises a detector 102 with a detection surface 102A similar to the detection system 100. In this example, the detector 102 is an unsealed PIN silicon diode comprising an intrinsic silicon layer sandwiched between a p-doped and an n-doped silicon layer. The PIN silicon diode is formed on a substrate (not shown), wherein the detection surface 102A consist of a hydroxylated silicon dioxide layer on top of the PIN diode structure. The detector 102 also comprises metallic contacts (not shown) that are connected to the p-doped and n-doped layers of the PIN diode through conduction lines, wherein the metallic contacts as well as parts of the conduction lines are exposed, i.e. not covered by a protective layer or housing.

In the example of FIG. 1b, the adsorption layer 106 consists of a monomolecular layer of adsorbent molecules 122. In this case, the thickness $d_s$ of the adsorption layer 106 is a fraction of the length of the adsorbent molecules 122, the fraction depending on the orientation of the adsorbent molecules 122. The thickness $d_s$ may thus for example be between 0.2 nm and 2 nm. In other examples, the adsorption layer 106 may consist of a multilayer structure of adsorbent molecules 122, for example a double layer or triple layer. A density of adsorbent molecules 122 in the adsorption layer 106 may for example be between $10^{12}$ 1/mm$^2$ and $10^{13}$ 1/mm$^2$, thus providing a density of docking sites for target particles 108 in the same range.

Each of the adsorbent molecules 122 comprises a head group 122A that is configured to form a chemical bond with the hydroxylated silicon dioxide layer 102A. The head group may for example comprise a compound selected from the group consisting of silanes (SiX), azides (N$_3$X), alkenes, alkynes and bifunctional thiols. Each of the adsorbent molecules 122 further comprises a linker chain 122B, e.g. an alkyl chain ((CH$_2$)$_n$), that connects the head group 122A to a functional group 122C. The functional group 122C is configured to form chemical bonds with a target molecule 108. Accordingly, the functional group 122C may be chosen depending on the type of target molecule 108 to be adsorbed. The functional group may e.g. comprise a compound selected from the group consisting of sulfonic acid (SO$_3$H), quaternary ammonium salts (NR$_4$X), complexation agents such as diglycolamide derivates like N,N,N',N'-tetraoctyl diglycolamide (TODGA), crown ether, tributyl phosphate derivates, ionic liquids such as 1-methylimidazol derivates, pyrrolidine, β-diketones, cavitand-groups like calixarene, cryptands, clathrate and bioactive substances like antibodies, proteins and nucleotides. The adsorbent molecules 122 may for example be based on (3-mercaptopropyl)trimethoxysilane or (3-aminopropyl)trimethoxysilane.

FIGS. 2a and 2b illustrate another example of a detection system 200 for ionizing radiation. FIG. 2a shows a sectional top view of the detection system 200 in the x-y plane parallel to a detection surface of the detection system 200 and FIG. 2b shows a sectional side view of the detection system 200 in the x-z plane perpendicular to the detection surface of the detection system 200.

The detection system 200 comprises a detector 102 configured to detect ionizing radiation, which may for example be similar to the detector 102 of FIG. 1a or FIG. 1b. In particular, the detector 102 has a detection surface 102A with an adsorption layer 106 (not shown) provided thereon, wherein the adsorption layer 106 is configured to bind target particles 108. The detection system 200 further comprises a flow cell 202 which encloses an inner volume 204. The flow cell 202 may for example comprise or consist of glass, plastic, metal or a combination thereof. The inner volume 204 may for example have a volume between 1 mm$^3$ and 1000 mm$^3$. The detector 102 is mounted in the flow cell 202 such that the adsorption layer 106 on the detection surface 102A is in contact with the inner volume 204. In the example shown in FIGS. 2a and 2b, the detector 102 is attached to an upper side wall of the inner volume 204.

The flow cell 202 comprises a pair of fluid connectors, a male connector 206A and a corresponding female connector 206B, which are arranged on opposing side faces of the flow cell 202. Accordingly, the flow cell 202 may be connected to another flow cell (not shown) through the connector 206A and/or 206B. The connectors 206A and 206B are in communication with the inner volume 204 of the flow cell 202 via two fluid channels 208A and 208B, which may for example have a cross-sectional area between 1 mm$^2$ and 100 mm$^2$. A sample medium can be supplied to the inner volume 204 through a tube (not shown) or another flow cell connected to one of the connectors 206A, 206B.

The flow cell 202 further comprises an electrical connector 210. The electrical connector 210 provides an electrical connection to the detector 102 mounted in the flow cell 202.

In the example shown in FIGS. 2a and 2b, the electrical connector 210 comprises two pins, which are electrically coupled to two contact pads (not shown) of the detector 102 and may be used to apply a voltage or current to the detector 102 and/or measure a voltage or current through the detector 102. The electrical connector 210 is configured to be removably connected to an external device (not shown) in order to electrically couple the detector to the external device, e.g. through a cable connected to the electrical connector 210.

The detection system 200 also comprises a second detector 212. The second detector 212 comprises a detection surface 212A and is configured to detect ionizing radiation that is incident on the detection surface 212A. The second detector 212 is mounted in the flow cell 202 such that the detection surface 212A of the second detector 212 faces the detection surface 102A of the detector 102. The second detector 212 may also be similar to one of the detectors 102 shown in FIG. 1a and FIG. 1b.

In particular, an adsorption layer (not shown) that is configured to bind target particles 108 is provided on the detection surface 212A. The adsorption layers of the second detector 212 and the detector 102, which in the following may also be referred to as the first detector 102, are configured to selectively bind to different types of target particles, e.g. different types of radioisotopes or molecules comprising different types of radioisotopes. In other words, the adsorption layer 106 of the first detector 102 is configured to bind a first type of target particles, but not a second type of target particles, whereas the adsorption layer of the second detector 212 is configured to bind target particles of the second type, but not target particles of the first type. For this, the adsorption layers of the first 102 and second detectors 212 comprise adsorbent molecules 122 with different functional groups 122C. The adsorption layer 106 of the first detector 102 may for example comprise adsorbent molecules 122 with a sulfonic acid group (SO$_3$H) that is configured to form a chemical bond with uranyl cations (UO$_2^{2+}$), whereas the adsorption layer of the second detector 212 may for example comprise adsorbent molecules with a crown ether such as 18-crown-6 ether that is configured to bind $^{226}$Ra in its cavity. The detection system 200 can thus be used to simultaneously detect different radioisotopes in the sample medium provided to the inner volume 204. To read out a measurement signal from the second detector 212, the electrical connector 210 comprises a second pair of pins (not shown).

In other examples, the detectors 102 and 212 may have adsorption layers configured to bind the same type of target particles. Furthermore, a distance between the detectors 102 and 212 may be chosen to be sufficiently small such that the detector 212 can detect ionizing radiation emitted by a target particle 108 bound to the adsorption layer 106 of the first detector 102 and vice versa. In this way, the active area for adsorbing target particles 108 as well as the solid angle covered by the detectors 102 and 212 may be increased. In one example, the distance between the detection surfaces of the detectors 102 and 212 may be between 1 µm and 30 µm, e.g. 10 µm. If the detectors 102 and 212 are to bind target particles of different types as described above, on the other hand, the distance between the detection surfaces of the detectors 102 and 212 is preferably chosen to be larger than a penetration depth of the ionizing radiation in the medium contained in the inner volume 204. For alpha particles, the range in water may for example be on the order of 10 µm to 100 µm. Accordingly, the distance between the detection surfaces of the detectors 102 and 212 may for example be larger than 1 mm.

FIGS. 3a and 3b depict another example of a detection system 300 for ionizing radiation. FIG. 3a shows a sectional top view of the detection system 300 in the x-y plane parallel a detection surface of the detection system 300 and FIG. 3b shows a sectional side view of a portion of the detection system 300 in the x-z plane perpendicular to the detection surface of the detection system 300.

The detection system 300 comprises a flow cell, in which a detector 102 is mounted. The flow cell may e.g. be the flow cell 202 and in particular comprises an inner volume 204 and two connectors 206A, 206B in communication with the inner volume 204 as well as an electrical connector 210. The detector 102 is a semiconductor charge-particle detector similar to the detector 102 of FIG. 1a or FIG. 1b and also comprises a detection surface 102A (not shown), on which an adsorption layer 106 that is configured to bind target particles 108 is provided.

The detection system 300 further comprises a measuring device 302 that is configured to read out a measurement signal from the detector 102. For this, the measuring device 302 can be connected to the electrical connector 210 of the flow cell 202 via a cable 304. This modular setup allows for using the measuring device 302 with a plurality of flow cells, e.g. to examine different samples and/or use flow cells with different detectors 102. The measuring device 302 comprises a controller 306, which is configured to read out the measurement signal from the detector 102 by measuring an electric current through the detector 102 using a measurement instrument 308, e.g. a voltmeter or ammeter. The measurement instrument 308 is further configured to apply a bias voltage to the detector 102.

As described above, whenever an ionizing particle enters the detection zone 102B of the detector 102, the ionizing particle may generate electron-hole pairs giving rise to an electric current. The resulting electric current spike or pulse, also referred to as an event in the following, is detected by the measurement instrument 308. The number of electron-hole pairs generated by the ionizing particle and thus the time-integrated electric current of the event may depend on the energy of the ionizing particle. The controller 306 is configured to determine an energy of the ionizing particle from the time-integrated electric current of the respective event, e.g. using a predetermined calibration curve. The controller 306 is further configured to determine an arrival time of the ionizing particle as well as to store an event sequence containing the determined energy and the arrival time of the detected events. The controller 306 is also configured to determine an energy spectrum of the ionizing radiation incident on the detector 102 from the event sequence, wherein the energy spectrum contains a number of events as a function of the energy associated with the event, e.g. as detailed below with reference to FIG. 5. The controller 306 is further configured to determine the half-life of a substance from the event sequence by determining a rate of events as a function of time and determining the associated decay constant, e.g. as detailed below with reference to FIG. 5. The controller 306 may be implemented in hardware, software or a combination thereof and may for example comprise a processor and a set of instructions to be executed by the processor to provide the functionality described above.

The measuring device 302 further comprises a display 310 that is configured to display information to a user, e.g. a current status of the measuring device 302, results of a measurement and/or an illustration of the event sequence and/or the energy spectrum. In the example shown in FIGS. 3a and 3b, the display 310 is a touchscreen that is configured to receive a user input, e.g. to initiate a measurement or to change settings of the measuring device 302. The measuring device 302 also comprises a communication module 312 that is configured to exchange data with a computing device. The communication module 312 may for example comprise an USB port, a LAN port, a Wi-Fi module, a Bluetooth module or a combination thereof. The controller 306 is configured to provide the event sequence, energy spectrum and/or half-life via the communication module 312 as well as to receive commands via the communication module 312, e.g. to initiate a measurement or to change settings of the measuring device 302. In addition, the measuring device 302 has a battery (not shown) such that the measuring device 302 can be used without an external power supply.

FIG. 4 depicts a flowchart of a method 400 of manufacturing a detection system for ionizing radiation according to an exemplary embodiment of the invention. The method 400 may be used to deposit an adsorption layer 106 onto the detection surface 10A of a detector 102, wherein the adsorption layer 106 is configured to bind radioactive target particles 108. The method 400 may for example be used to manufacture the detection system 120 having an unsealed semiconductor diode as the detector 102 and is explained in the following with reference to FIG. 1b. This is, however, not intended to be limiting in any way and the method 400 may be used to manufacture other detection systems having a detector with a detection surface that is configured to detect ionizing radiation, for example the detection systems 100, 200, and 300. Furthermore, the flowchart in FIG. 4 is for illustration only and does not imply a certain order of execution of the method 400. As far as technically feasible, steps of the method 400 may be permuted and may in particular be performed simultaneously at least in part.

In step 402, the detector 102 with the detection surface 102A is provided, wherein the detector 102 is configured to detect ionizing radiation that is incident on the detection surface 102A. In the example of FIG. 1b, the detector 102 is an unsealed silicon PIN diode with a silicon dioxide layer forming the detection surface 102A. Accordingly, the semiconductor structure as well as metallic contacts and conduction lines of the detector 102 are exposed at least in part. In order to not damage the detector 102, the method 400 employs a sequence of processing steps 404 to 410, which are optimized to minimize the impact on the detector 102.

After the detector 102 has been provided, the detection surface 102A is cleaned and chemically activated in step 404. For this, the detection surface 102A is exposed to a low-pressure water plasma, e.g. by placing the detector 102 in a vacuum chamber evacuated to a pressure between $10^{-3}$ to $10^{-1}$ mbar to which a reservoir of distilled water is connected through a valve. By opening the valve, a low-pressure water vapor is created in the vacuum chamber with a pressure that depends on the temperature of the vacuum chamber. To minimize the thermal strain on the detector 102, a temperature in the range between 10° and 40° corresponding to a vapor pressure between 12 mbar and 74 mbar may be used, preferably a temperature between 20° C. and 30° C. Subsequently, a water plasma is generated in the vicinity of the detection surface 102A, e.g. using an AC or DC electromagnetic field. The detection surface 102A is for example exposed to the water plasma for between 5 min and 30 min. The water plasma may remove contaminants from the detection surface 102A and may hydroxylate the silicon dioxide surface, thereby creating docking sites for adsorbent molecules 122 to be grafted onto the detection surface 102A in step 406. In other examples, the detection surface 102A may additionally or alternatively be cleaned and chemically activated using ozone treatment and/or UV radiation or a different plasma, for example oxygen plasma.

Subsequently, in step 406, linker molecules are grafted onto the detection surface 102A, e.g. using chemical vapor deposition. In the example of the detection system 120, silane monomers may be used as linker molecules, e.g. (3-mercaptopropyl)trimethoxysilane (MPTMS) or (3-aminopropyl)trimethoxysilan (APTMS). To perform the chemical vapor deposition, the detector 102 is placed in a vacuum chamber to which a reservoir containing linker molecules is connected through a valve. Preferably, the same vacuum chamber is used as for the cleaning and chemical activation in step 404 to avoid having to transfer the detector 102 between vacuum chambers. The vacuum chamber is evacuated to a pressure between 0.01 mbar and 50 mbar, e.g. 10 mbar. As in step 404, thermal strain on the detector 102 may be reduced by performing the chemical vapor deposition at a low temperature, i.e. at a low vapor pressure of the linker molecules. The chemical vapor deposition may for example be performed at a vapor pressure of the linker molecules below 10 mbar, e.g. at a temperature between 30° C. and 50° C. The duration of the chemical vapor deposition is chosen depending on the desired thickness of the adsorption layer 106 on the detection surface 102A and the vapor pressure of the linker molecules. The duration of the chemical vapor deposition may e.g. be between 5 minutes and 3 hours to create a silane monolayer.

After grafting the linker molecules onto the detection surface 102A, the detection surface 102A is cured in step 408 by exposing the detector 102 to water vapor at a curing temperature for a predefined curing time. The curing temperature may e.g. be between 40° C. and 60° C. corresponding to a water vapor pressure between 74 mbar and 200 mbar. That curing may improve the homogeneity of the adsorption layer 106 by filling vacancies within the adsorption layer 106 and/or binding or removing unbound linker molecules.

In step 410, the linker molecules are transformed to adsorbent molecules 122 by modifying a functional group of the linker molecules such that the functional group is configured to chemically bind to a target particle 108. The procedure depends on the type of linker molecules that are used as well as the desired functional group 122C of the adsorbent molecules 122. When using MPTMS, for example, the thiol end group (SH) may e.g. be oxidized to obtain a sulfonic acid group ($SO_3H$). In some examples, step 410 may be performed prior to the grafting of molecules onto the detection surface 102A in step 406.

After depositing the adsorption layer 106 onto the detection surface 102A, the method 400 may further comprise mounting the detector 102 in a flow cell, e.g. the flow cell 202 of FIGS. 2a and 2b. For this, the detector 102 may for example be attached to a side wall of the inner volume 204 of the flow cell 202, e.g. by gluing the detector 102 to the side wall and/or using a mechanical mounting structure comprising a fastener such as a hook or clip to support the detector 102. Mounting the detector 102 in the flow cell 202 may further comprise connecting contact parts of the detector 102 to the electrical connectors 210 of the flow cell 202.

FIG. 5 depicts a flowchart of a method 500 of detecting ionizing radiation in accordance with an embodiment of the invention. The method 500 may for example be executed using the detection system 300 and will be described in the following with reference to FIGS. 3a and 3b. This is, however, not intended to be limiting in any way and the method 500 may be executed using other detection systems having a detector with a detection surface that is configured to detect ionizing radiation, for example the detection systems 100, 120, and 200. Furthermore, the flowchart in FIG. 5 is for illustration only and does not imply a certain order of execution of the method 500. As far as technically feasible, steps of the method 500 may be permuted and may in particular be performed simultaneously at least in part.

In step 502, a detector 102 with a detection surface 102A and an adsorption layer 106 thereon is provided, wherein the detector 102 is configured to protect ionizing radiation that is incident on the detection surface 102A and the adsorption layer 106 is configured to bind radioactive target particles 108. In case of the detection system 300, the detector 102 is provided by providing the flow cell 202 that the detector 102 is mounted in. The detector 102 is connected to the measuring device 302 by attaching the cable 304 to the electrical connector 210 of the flow cell 202.

In step 504, a sample medium containing the target particles 108 is provided such that the adsorption layer 106 of the detector 102 is in contact with the sample medium. For this, tubes are connected to the connectors 206A and 206B of the flow cell 202 to supply the sample medium to the inner volume 204 of the flow cell 202, e.g. from a sample reservoir or a syringe containing the sample medium. Depending on the type of radioisotopes to be detected and the adsorption layer 106 of the detector 102, step 504 may comprise transforming precursor radioisotopes or precursor molecules in the sample medium to target particles 108 that can be bound by the adsorption layer 106 of the detector 102. The sample medium may for example comprise a uranyl complex or a uranyl containing mineral, from which uranyl ions may be extracted to be adsorbed by suitable adsorption layer.

In step 506, target particles 108 from the sample medium are bound to the adsorption layer 106, e.g. by keeping the adsorption layer 106 in contact with the sample medium for a predefined contact time such that target particles 108 from the sample medium can form chemical bonds with the adsorption layer 106, for example through an ion exchange. The contact time is chosen depending on the kinetics of the respective binding reaction and a concentration of target particles 108 in the sample medium, e.g. to achieve a complete covering of the adsorption layer 106 with target particles 108.

In step 508, ionizing radiation incident on the detection surface 102A of the detector 102 is detected using the measuring device 302. For this, the measurement signal, i.e. the electric current through the detector 102, is read out from the detector 102 using the measuring instrument 308 during a predetermined measurement time, which may for example be chosen depending on a measured or expected event rate of the sample medium. Subsequently, the controller 306 determines an event sequence from the measurement signal as described above, i.e. the controller 306 identifies events and determines the corresponding energy and arrival time. To reduce the probability of accidentally detecting an event when no ionizing particle is present in the detection zone 102B of the detector 102, a minimum energy threshold is used, wherein only events with an energy exceeding the minimum energy threshold are considered.

In step 510, an energy spectrum of the ionizing radiation is determined using the controller 306. To obtain the energy spectrum, the events in the event sequence are binned based on their energy and the number of events in each energy bin is determined. An exemplary energy spectrum 600 is shown in FIG. 6, which depicts the number of events n as a function of the energy E. The energy spectrum 600 contains two contributions, a resonant peak 602 and a continuous background spectrum 604. The resonant peak 602 results from ionizing radiation emitted by decaying target particles 108 that are bound to the adsorption surface 102A of the detector 102. If the target particles e.g. the flow cell 202 contain uranium, the resonant peak 602 may e.g. have its maximum at an energy of 4.27 MeV and 4.86 MeV for $^{238}$U and $^{234}$U, respectively. The continuous background spectrum 604 arises from ionizing radiation emitted by decaying target particles 108 in the sample medium. Unlike for the target particles 108 bound to the adsorption surface, the distance between the point of emission and the detection zone 102B of the detector 102 varies in this case and the spectrum is thus broadened due to scattering of the ionizing radiation between the point of emission and detection zone 102B. To extract the resonant contribution 602, the detection in step 508 may be performed after removing the sample medium from the inner volume 204. Alternatively, a background subtraction may be performed, wherein the continuous background spectrum 604 is determined approximately and subsequently subtracted from the measured spectrum 600 to obtain a background-subtracted spectrum 606, which is predominantly determined by the resonant contribution 602. The continuous background spectrum 604 can e.g. be determined approximately by fitting a suitable fit function to the measured spectrum 600 or by performing a reference measurement with a detector that does not comprise an adsorption layer.

In step 512, the half-life of a substance is determined from the event sequence. For this, a time trace of the ionizing radiation incident on the detection surface 102A is obtained by determining the rate of events, i.e. the number of events per unit of time, as a function of time. From the time trace, the half-life may for example be determined by an exponential fit. In some examples, the half-life of multiple substances may be determined, e.g. by fitting multiple exponential functions to the time trace. The energy spectrum determined in step 510 as well as the half-life determined in step 512 may allow for identifying radioisotopes present in the sample medium and the respective concentration.

In some examples, the method 500 may also comprise regenerating the detector 102, i.e. removing the target particles 108 bound to the adsorption surface 106 such that the detector 102 can be re-used for another measurement, e.g. a subsequent execution of the method 500. The detector 102 may for example be regenerated by rinsing the adsorption layer 106 with hydrochloric acid.

The method 500 may also be used to selectively detect ionizing radiation from different types of target particles, e.g. target particles comprising different types of radioisotopes. For this, the method 500 may e.g. be executed multiple times using different detectors, e.g. by providing, in step 502, a flow cell with a detector with a different adsorption layer for every execution. Alternatively, a flow cell with multiple detectors having different adsorption layers may be provided in step 502, e.g. the flow cell 202. A corresponding example in accordance with the invention is described in the following.

In this example, the two detectors 102, 212 are provided in step 502 by providing the flow cell 202. The adsorption layer 106 of the first detector 102 is configured to bind target particles of a first type, but not target particles of a second type, whereas the adsorption layer of the second detector 212 is configured to bind target particles of the second type, but not target particles of the first type. The adsorption layer 106 of the first detector 102 may for example comprise adsorbent molecules 122 with a sulfonic acid group ($SO_3H$) that is configured to form a chemical bond with uranyl cations ($UO_2^{2+}$), whereas the adsorption layer of the second detector 212 may for example comprise adsorbent molecules 122 with a crown ether such as 18-crown-6 ether that is configured to bind $^{226}$Ra in its cavity.

In step 504, the sample medium is provided. The sample medium contains precursor molecules of a first type comprising a radioisotope of the first type, e.g. a uranyl compound, and precursor molecules of a second type comprising a radioisotope of the second type, e.g. a radium compound. The precursor molecules of the first type are transformed to target particles of the first type, e.g. uranyl cations, and the precursor molecules of the second type are transformed to target particles of the second type, e.g. radium ions. Subsequently, the sample medium is supplied to the inner volume 204 of the flow cell 202 to bring the sample medium in contact with the adsorption surfaces of the first detector 102 and the second detector 212.

In step 506, target particles of the first type are bound to the adsorption layer 106 of the first detector 102 and target particles of the second type are bound to the adsorption layer of the second detector 212. The selectivity of the adsorption layers and the preparation of the sample medium in step 504 ensure that only particles of the respective type are bound. In step 508, ionizing radiation incident on the detection surfaces of the detectors 102 and 212 is detected individually, thereby determining an event sequence associated with target particles of the first type and an event sequence associated with target particles of the second type. The data analysis in steps 510 and 512 can thus subsequently be performed separately for the two types of target particles.

FIGS. 7a-7c depict another example of a detection system 700 for ionizing radiation. FIG. 7a shows a perspective view of the detection system 700 in an assembled state. FIG. 7b depicts the detection system 700 in an exploded view and FIG. 7c depicts a bottom portion 702A of the detection system 700 in an exploded view.

The detection system 700 is similar to the detection system 200 shown in FIGS. 2a and 2b and also comprises a flow cell 702, in which a detector 102 configured to detect ionizing radiation can be mounted. The flow cell 702 has a bottom portion 702A and a top portion or top plate 702B, each of which comprises a plurality of screw holes for attaching the bottom portion 702A to the top plate 702B with screws (not shown). The top plate 702B has a cut-out 704 that is configured to receive an electrical connector 210, which provides an electrical connection to the detector 102 mounted in the flow cell 702, e.g. to connect the detector 102 to an external device such as the measuring device 302.

The bottom portion 702A comprises a detector mount 706 and a bottom plate 708, each of which has a plurality of screw holes for attaching the detector mount 706 to the bottom plate 708 with screws (not shown). The detector mount 706 comprises a cut-out 710, which forms sidewalls of an inner volume 204 of the flow cell 702 when the flow cell 702 is assembled. The detector 102 is placed on the detector mount 706 such that an adsorption layer 106 on a detection surface 102A (not shown) of the detector 102 is in contact with the inner volume 204. When the flow cell 702 is assembled, the detector 102 is clamped onto the detector mount 706 by the top plate 702B. In this way, the flow cell 702 can be disassembled, e.g. to exchange the detector 102 or to remove the detector 102 for regeneration. Additionally or alternatively, the detector 102 may also be attached to the detector mount 706 by other means, e.g. glued to the detector mount 706 or mounted in a mechanical mounting structure comprising a fastener. In some examples, a gasket or seal ring (not shown) may be placed between the detector 102 and the detector mount 706 to seal off the inner volume 204.

The bottom plate 708 comprises a pair of connectors 206A and 206B arranged on opposing side faces of the bottom plate 708. The connectors 206A, 206B are in communication with the inner volume 204 via fluid channels 208A and 208B connecting the connectors 206A and 206B to openings 712A and 712B, respectively, in a center portion of a top surface of the bottom plate 708. The openings 712A, 712B are surrounded by a gasket or seal ring 714, which is configured to seal off the inner volume 204 when the detector mount 704 is placed on the bottom plate 708. The openings 712A, 712B are arranged in the inner volume such that the openings 712A, 712B face the adsorption layer 106 of the detector 102 when the flow cell 702 is assembled. This may increase a binding probability of the target particles 108 to the adsorption layer 106, in particular when providing a sample medium to the inner volume 204 with a low flow velocity, for which the flow of the sample medium may be a laminar flow.

The invention further provides a detection chamber for detecting ionizing radiation by liquid scintillation counting. The detection chamber comprises a transparent wall enclosing a detection volume, wherein the detection volume is configured to receive a fluid medium. The detection chamber further comprises an adsorption layer provided on an inner surface of the transparent wall, wherein the adsorption layer is in contact with the detection volume. The adsorption layer is configured to bind target particles, wherein the target particles are radioactive atoms or molecules.

FIG. 8 depicts a schematic cross-sectional view of a detection chamber 800 for detecting ionizing radiation by liquid scintillation counting according to an exemplary embodiment of the invention. The detection chamber 800 comprises a transparent wall, which in this examples is formed by a vial or test tube 802. The vial 802 encloses a detection volume 804 that is configured to receive a fluid medium, in particular a liquid medium. The vial 802 may for example have a cylindrical or cuboid shape. To receive the fluid medium, the vial 802 may comprise one or more openings. The vial 802 comprises or consists of a transparent material, e.g. a glass, a transparent plastic, or a combination thereof, to allow for the detection of light emitted from the detection volume 804. Preferably, an inner surface 802A of the vial 802 that faces the detection volume 804 comprises or consists of silicon dioxide. In some examples, the vial 802 may further comprise a removable cap or cover (not shown) for sealing the detection volume 804.

An adsorption layer 806 is provided on the inner surface 802A of the vial 802 such that the adsorption layer 806 is exposed to the detection volume 804. Preferably, the adsorption layer 806 is in direct contact with the inner surface 802A, i.e. may be formed directly on the transparent wall of the detection chamber 800. The adsorption layer 806 is configured to bind target particles contained in the detection volume 804, e.g. by chemisorption. The adsorption layer 806 may for example be similar to the adsorption layer provided on the detection surface of a detection system for ionizing radiation according to one of the embodiments described above, e.g. the adsorption layer 106 of FIG. 1a or 1b, wherein the detection surface of the detector is replaced by the inner surface 802A. The adsorption layer 806 may in particular be attached to the inner surface 802A through chemical bonds between the adsorption layer 806 and the inner surface 802A and may e.g. comprise functionalized silanes and/or functionalized azides. The adsorption layer 806 may cover the entire inner surface 802A or a part thereof, e.g. between 50% and 90% of the surface area of the inner surface 802A.

In other embodiments, the detection chamber may for example be similar to the flow cell of a detection system for ionizing radiation according to one of the embodiments described above, e.g. the flow cell 202 of FIGS. 2a, 2b. The flow cell 202 may for example comprise or consist of a transparent material at least in part, e.g. at least the walls surrounding the inner volume 204, which may form the detection volume. In some examples, the entire flow cell 202 may consist of a glass. The adsorption layer 806 may for example be arranged on a surface of the flow cell 202 facing the inner volume 204 similar to the detector 102 or 212 as shown in FIGS. 2a, 2b. In other words, the flow cell 202 may e.g. comprise the adsorption layer 806 instead of the detectors 102 and 212, wherein the adsorption layer 806 is directly formed on an inner surface of a wall surrounding the inner volume 204.

In some examples, the detection chamber 800 may comprise a second adsorption layer (not shown) provided on the inner surface 802A of the vial 802, wherein the adsorption layer 806 may be configured to bind target particles of a first type, but not target particles of a second type, whereas the second adsorption layer may be configured to bind target particles of the second type, but not target particles of the first type, e.g. as described above.

In some embodiments, the detection chamber 800 may be part of or configured for use with a detection system (not shown) comprising a detector that is configured to detect light emitted from the detection volume 804, e.g. as a result of scintillation induced by ionizing radiation emitted by target particles. The detection system may for example comprise a measuring device such as a liquid scintillation counter, wherein the measuring device may be configured to removably receive the detection chamber 800. The measuring device may e.g. comprise a photodetector, in particular a photomultiplier tube, configured to detect light emitted from the detection volume 804 when the detection chamber 800 is arranged in the measuring device. The measuring device may for example comprise a slot or mount that is configured to receive the vial 802 such that the photodetector faces the vial 802. The measuring device may be similar to the measuring device 302 of the detection system 300 described above and may e.g. further comprise a controller configured to read out a measurement signal from the photodetector, wherein the controller may e.g. be similar to the controller 306. The controller may in particular be configured to determine a count rate and/or an energy spectrum of the ionizing radiation.

The invention further provides a method of detecting ionizing radiation by liquid scintillation counting. The method comprises (1) providing a detection chamber enclosing a detection volume configured to receive a fluid medium. An adsorption layer is provided on an inner surface of the detection chamber, the adsorption layer being in contact with the detection volume. The adsorption layer is configured to bind target particles, wherein the target particles are radioactive atoms or molecules. The method further comprises (2) binding target particles to the adsorption layer; (3) providing a fluid detection medium in the detection volume such that the adsorption layer is in contact with the detection medium, wherein the detection medium comprises a scintillating substance; and (4) detecting ionizing radiation in the detection volume by detecting light emitted by the scintillating substance. The numbering of steps is for clarity only and does not imply a certain order of execution of the method. As far as technically feasible, steps of the method may be permuted and may in particular be performed simultaneously at least in part.

FIG. 9 shows a flowchart of a method 900 of detecting ionizing radiation by liquid scintillation counting according an exemplary embodiment of the invention. The method 900 is described in the following using the detection chamber 800 of FIG. 8 as an example for illustration purposes. This is, however, not intended to be limiting in any way and the method 900 may be executed using a different detection chamber, in particular using any other detection chamber for detecting ionizing radiation by liquid scintillation counting according to one of the embodiments described herein. Furthermore, the method 900 is not limited to the order of execution shown in the flow chart of FIG. 9.

The method 900 comprises, in step 902, providing a detection chamber with an adsorption layer on an inner surface thereof, e.g. by providing the detection chamber 800. In some examples, this may comprise depositing the adsorption layer 806 on the inner surface 802A, e.g. similar to the method of manufacturing a detection system for ionizing radiation according to one of the embodiments described above. Preferably, the vial 802 is provided with the adsorption layer 806 already formed thereon.

In step 904, a fluid sample medium is provided in the detection volume 804 such that the adsorption layer 806 is in contact with the sample medium, e.g. similar to step 506 of method 500. This may for example comprise filling the liquid or gaseous sample medium into the vial 802. The sample medium may contain radioactive target particles and the method 900 may for example be used to detect the presence of the target particles in the sample medium and in particular to determine a concentration of the target particles in the sample medium. In one example, the sample medium is a water sample and the target particles comprise a radionuclide such as radium.

In some examples, the sample medium may initially contain precursors of the target particles, e.g. precursor radioisotopes or precursor molecules comprising a radioisotope. Providing the sample medium in step 904 may comprise transforming the precursor radioisotopes or precursor molecules to the target particles, e.g. as described above. This may in particular comprise adding a transforming solution to the sample medium, wherein the transforming solution may e.g. comprise a transforming reagent configured to transform the precursors from a chemical state in which the precursors do not bind to the adsorption layer 806 to a chemical state in which the precursors/target particles bind to the adsorption layer 806. In some examples, the transforming solution may additionally or alternatively be configured to transform particles that are not target particles to a chemical state in which the non-target particles do not bind to the adsorption layer 806. Preferably, the transforming solution comprises a mineral acid such as sulfuric acid, hydrochloric acid, and/or nitric acid. The transforming solution may for example be added to the sample medium up to a pre-defined concentration or until a pre-defined pH value is reached. The transforming solution may be added after or preferably prior to providing the sample medium in the detection volume 804.

In step 906, target particles from the sample medium are bound to the adsorption layer 806, e.g. similar to step 508 of method 500. This may for example comprise holding the sample medium in the detection volume 804 for a time sufficient to allow the target particles to bind to the adsorption layer, e.g. between 5 min and 30 min.

Subsequently, the sample medium may be removed from the detection volume in step 908, preferably prior to providing the detection medium in step 910. In some examples, this may comprise rinsing the detection volume 804 with a buffer solution and/or with the detection medium. This may in particular comprise removing target particles that are not bound to the adsorption layer 806 from the detection volume 804.

In step 910, a fluid detection medium is provided in the detection volume 804 such that the adsorption layer 806 is in contact with the fluid detection medium. The fluid detection medium comprises a scintillating substance, i.e. a substance exhibiting luminescence upon excitation by ionizing radiation, in particular alpha and/or beta particles. The scintillating substance may for example be a liquid scintillation cocktail comprising a scintillator dissolved in an organic solvent, wherein the organic solvent may e.g. be configured to absorb an ionizing particle and transfer at least a part of the absorbed energy to the scintillator, which in turn may emit a photon by fluorescence or phosphorescence, preferably in the visible spectrum. The scintillator may for example comprise one or more substances selected from the group consisting of 2,5-Diphenyloxazole (PPO), 2-(4-Biphenylyl)-5-phenyl-1,3,4-oxadiazole (PBD), p-terphenyl, and Zinc sulfide. The organic solvent may for example comprise one or more substances selected from the group consisting of toluene, xylene, 1,2,4-Trimethylbenzene, diisopropylnaphthalene (DIPN), phenylxylylethane (PXE), and linear alkyl benzene (LAB). In some examples, the scintillating substance may also comprise a secondary scintillator or wavelength shifter. In step 912, ionizing radiation is detected in the detection volume 804 by detecting light emitted by the scintillating substance, i.e. while the detection medium is held in the detection volume. The ionizing radiation may in particular be ionizing radiation emitted into the detection volume 804 by target particles bound to the adsorption layer 806. The ionizing radiation may for example be detected with a photodetector such as a photomultiplier tube, for example in a liquid scintillation counter. Accordingly, step 912 may e.g. comprise closing the vial 802 and placing the vial in the liquid scintillation counter. In some examples, step 912 may also comprise determining a count rate and/or an energy spectrum of the ionizing radiation and/or a concentration of target particles in the sample medium.

By using a detection system with a selective adsorption layer for the target particles as described above, the method allows for detecting ionizing radiation from target particles by liquid scintillation counting without requiring a complicated sample preparation as in methods known from the prior art. The latter may for example involve one or more radiochemical separation processes to prepare a sample medium that is subsequently mixed with a liquid scintillation cocktail. This may lead to quenching effects due to the presence of contaminating substances in the sample medium. Furthermore, some or all of the above steps of the method according to the invention can be automated easily, thereby allowing for a fast and parallelized processing of a large number of samples.

Embodiments of the present invention disclosed herein only constitute specific examples for illustration purposes. The present invention can be implemented in various ways and with many modifications without altering the underlying basic properties. Therefore, the present invention is only defined by the claims as stated below.

LIST OF REFERENCE SIGNS

100—detection system
102—detector
102A—detection surface
102B—detection zone
104—metallic contacts
106—adsorption layer
108—target particle
110—chemical bond between target particle 108 and adsorption layer 106
$d_s$—thickness of adsorption layer 106
120—detection system
122—adsorbent molecule
122A—head group
122B—linker chain
122C—functional group
200—detection system
202—flow cell
204—inner volume
206A/B—fluid connectors
208A/B—fluid channels
210—electrical connector
212—second detector
212A—detection surface of second detector 212
300—detection system
302—measuring device
304—cable
306—controller
308—measurement instrument
310—display
312—communication module
400—method of manufacturing a detection system
402—step of providing detector
404—step of chemically activating detection surface
406—step of grafting linker molecules onto detection surface
408—step of curing detection surface
410—step of transforming linker molecules to adsorbent molecules
500—method of detecting ionizing radiation
502—step of providing detector
504—step of providing sample medium
506—step of binding target particles to adsorption layer
508—step of detecting ionizing radiation with detector
510—step of determining energy spectrum of ionizing radiation
512—step of determining half-life of substance
600—energy spectrum of ionizing radiation
602—resonant peak
604—continuous background spectrum
606—background-subtracted energy spectrum
700—detection system
702—flow cell
702A—bottom portion of flow cell 702
702B—top portion of flow cell 702
704—cut-out in top portion 702B
706—detector mount
708—bottom plate
710—cut-out in detector mount 706
712A/B—opening in bottom plate 708
714—gasket
800—detection chamber
802—vial/transparent wall
802A—inner surface of vial 802
804—detection volume
806—adsorption layer
900—method of detecting ionizing radiation by liquid scintillation counting
902—step of providing a detection chamber
904—step of providing a fluid sample medium
906—step of binding target particles to the adsorption layer
908—step of removing the sample medium
910—step of providing a fluid detection medium
912—step of detecting ionizing radiation

What is claimed is:

1. A detection system for ionizing radiation, the detection system comprising a detector with a detection surface, wherein:
the detector is configured to detect ionizing radiation that is incident on the detection surface; and
an adsorption layer is provided on said detection surface, the adsorption layer being configured to bind target particles, wherein the target particles are radioactive atoms or molecules and the adsorption layer comprises one or both of functionalized silanes and functionalized azides.

2. The detection system of claim 1, wherein the adsorption layer is configured to bind the target particles by chemisorption.

3. The detection system of claim 1, wherein the adsorption layer is attached to the detection surface through chemical bonds between the adsorption layer and the detection surface.

4. The detection system of claim 1, wherein a thickness of the adsorption layer is less than 20 nm.

5. The detection system of claim 4, wherein the adsorption layer is a monomolecular layer of adsorbent molecules, wherein the adsorbent molecules are configured to form chemical bonds with the target particles.

6. The detection system of claim 1, further comprising a flow cell, wherein the detector is mounted in the flow cell such that the adsorption layer of the detector is in contact with an inner volume of the flow cell.

7. The detection system of claim 6, wherein the flow cell comprises an input fluid connector and an output fluid connector, the input and output fluid connectors being in communication with the inner volume of the flow cell and being configured to receive a sample medium, wherein one or both of the input and output fluid connector is/are configured to be connected to a fluid connector of another flow cell.

8. The detection system of claim 6, wherein the detector is a first detector and the detection system further comprises a second detector, wherein:
the second detector is configured to detect ionizing radiation that is incident on a detection surface of the second detector; and
the second detector is mounted in the flow cell such that the detection surface of the second detector is in contact with the inner volume of the flow cell, wherein:
the target particles are target particles of a first type;

the adsorption layer of the first detector is configured to bind target particles of the first type, but not target particles of a second type; and an adsorption layer is provided on the detection surface of the second detector, the adsorption layer being configured to bind target particles of the second type, but not target particles of the first type.

9. The detection system of claim 8, wherein the detection surface of the second detector faces the detection surface of the first detector and a distance between the detection surfaces of the first and second detectors is less than 30 μm.

10. A method of manufacturing a detection system for ionizing radiation, the method comprising:

providing a detector with a detection surface, wherein the detector is configured to detect ionizing radiation that is incident on the detection surface; and depositing an adsorption layer onto the detection surface, the adsorption layer being configured to bind target particles, wherein the target particles are radioactive atoms or molecules and the adsorption layer comprises one or both of functionalized silanes and functionalized azides.

11. The method of claim 10, wherein depositing the adsorption layer onto the detection surface comprises:

grafting adsorbent molecules onto the detection surface, wherein the adsorbent molecules are configured to chemically bind to the target particles.

12. The method of claim 11, wherein the adsorbent molecules are grafted by chemical vapor deposition at a temperature between 20° C. and 70° C.

13. The method of claim 11, wherein grafting the adsorbent molecules onto the detection surface comprises:

grafting linker molecules onto the detection surface; and transforming the linker molecules to the adsorbent molecules by modify a functional group of the linker molecules such that the functional group is configured to chemically bind to a target particle.

14. The method of claim 10, wherein depositing the adsorption layer onto the detection surface further comprises:

curing the detection surface in the presence of water vapor at a temperature between 30° C. and 70° C.

15. The method of claim 10, further comprising:

chemically activating the detection surface by one or more of plasma treatment, ozone treatment, and UV irradiation.

16. A method of detecting ionizing radiation, the method comprising:

providing a detector with a detection surface and an adsorption layer provided on said detection surface, wherein the detector is configured to detect ionizing radiation that is incident on the detection surface and the adsorption layer is configured to bind target particles, wherein the target particles are radioactive atoms or molecules and the adsorption layer comprises one or both of functionalized silanes and functionalized azides;

binding target particles to the adsorption layer; and detecting ionizing radiation incident on the detection surface with the detector.

17. The method of claim 16, further comprising:

providing a fluid sample medium containing the target particles such that the adsorption layer is in contact with the sample medium, wherein the sample medium contains precursor radioisotopes or precursor molecules comprising a radioisotope and providing the fluid sample comprises transforming the precursor radioisotopes or precursor molecules to the target particles.

18. The method of claim 16, wherein the detector is a first detector and the target particles are target particles of a first type; and the adsorption layer of the first detector is configured to bind target particles of the first type, but not target particles of a second type, the method further comprising:

providing a second detector with a detection surface and an adsorption layer provided on said detection surface of the second detector, wherein the second detector is configured to detect ionizing radiation that is incident on the detection surface of the second detector and the adsorption layer of the second detector is configured to bind target particles of the second type, but not target particles of the first type;

binding target particles of the second type to the adsorption layer of the second detector; and detecting ionizing radiation incident on the detection surface of the second detector with the second detector.

19. The method of claim 18, further comprising transforming precursor radioisotopes of a first type or precursor molecules comprising a radioisotope of the first type to target particles of the first type and transforming precursor radioisotopes of a second type or precursor molecules comprising a radioisotope of the second type to target particles of the second type.

* * * * *